United States Patent [19]
Sekine

[11] Patent Number: 5,186,150
[45] Date of Patent: Feb. 16, 1993

[54] METHOD AND SYSTEM FOR MEASURING FLUID FLOW RATE BY USING FUZZY INFERENCE

[75] Inventor: Yoshihito Sekine, Ibaraki, Japan

[73] Assignee: Hitachi, Ltd., Tokyo, Japan

[21] Appl. No.: 757,063

[22] Filed: Sep. 9, 1991

[30] Foreign Application Priority Data

Sep. 7, 1990 [JP] Japan .................................. 2-237670

[51] Int. Cl.$^5$ ............................................ F02M 51/00
[52] U.S. Cl. .................................................. 123/494
[58] Field of Search ....................... 123/494, 488, 489;
   73/35, 118.2, 204.21, 204.22; 364/431.04

[56] References Cited

U.S. PATENT DOCUMENTS

| | | | |
|---|---|---|---|
| 4,951,209 | 8/1990 | Nagaishi et al. | 364/431.04 |
| 4,957,088 | 9/1990 | Hosaka | 123/494 |
| 4,967,715 | 11/1990 | Hosaka | 123/494 |
| 4,974,503 | 12/1990 | Ikeda et al. | 123/494 |
| 4,991,560 | 2/1991 | Arai | 123/494 |
| 5,050,560 | 9/1991 | Plapp | 123/488 |

Primary Examiner—Raymond A. Nelli
Attorney, Agent, or Firm—Antonelli, Terry, Stout & Kraus

[57] ABSTRACT

Flow rate measuring method and apparatus for determining a flow rate of a fluid flowing through a pipe by using a fuzzy inference system which is operative on the basis of fuzzy knowledge including fuzzy rules each described in the form of an IF part and a THEN part, and membership functions defining meanings of statements described in said IF and THEN parts. Flow velocity of the fluid is measured at a plurality of locations within the pipe by a plurality of sensors. A table of membership functions indicating grades of fitness of the flow velocities to a distorted flow model distribution is provided in a storage together with a mean flow rate calculating expression for deriving a flow rate corresponding to the distorted flow model distribution. A membership grade of the measured flow velocity to the distorted flow model distribution is determined by referring to the membership function table through the medium of the measured flow velocity, and a weighted mean of the flow rates given by the mean flow rate calculating expression is determined by using as a weight the membership grade to the distorted flow model distribution.

24 Claims, 17 Drawing Sheets

FIG. 5

| MEASURED FLOW VELOCITY RANGE / FLOW VELOCITY LEVEL | $U_{d1}$ | $U_{d2}$ | ---- | $U_{dL}$ |
|---|---|---|---|---|
| $U_1$ | $\zeta_{11}$ | $\zeta_{12}$ | ---- | $\zeta_{1L}$ |
| $U_2$ | $\zeta_{21}$ | $\zeta_{22}$ | ---- | $\zeta_{2L}$ |
| ⋮ | ⋮ | ⋮ | ---- | ⋮ |
| $U_K$ | $\zeta_{K1}$ | $\zeta_{K2}$ | ---- | $\zeta_{KL}$ |

| FLOW VELOCITY LEVEL $U_k$ / NORMALIZED FLOW VELOCITY MEASUREMENT VALUE / DISTORTED FLOW MODEL | $\hat{u}_1$ | $\hat{u}_2$ | ---- | $\hat{u}_M$ |
|---|---|---|---|---|
| $D_{m1}$ | $\mu_{11k}$ | $\mu_{12k}$ | ---- | $\mu_{1Mk}$ |
| $D_{m2}$ | $\mu_{21k}$ | $\mu_{22k}$ | ---- | $\mu_{2Mk}$ |
| ⋮ | ⋮ | ⋮ | ---- | ⋮ |
| $D_{mN}$ | $\mu_{N1k}$ | $\mu_{N2k}$ | ---- | $\mu_{NMk}$ |

$T_{2k}$ $k = (1, 2 \cdots, K)$

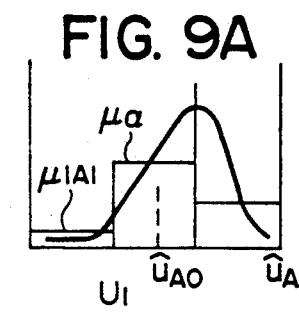
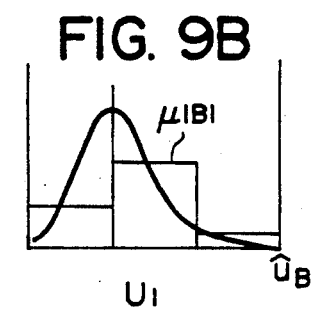
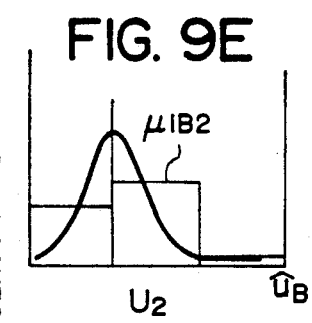
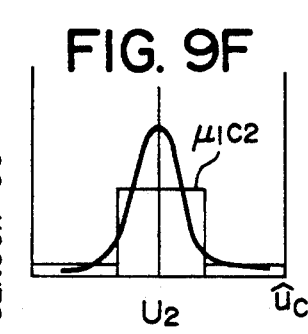
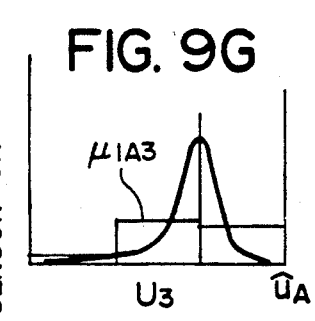
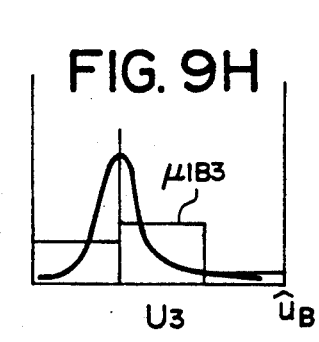
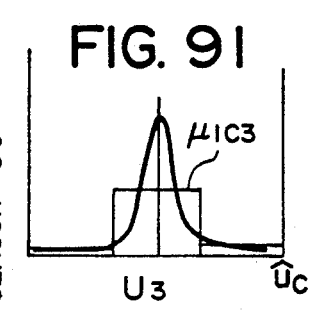
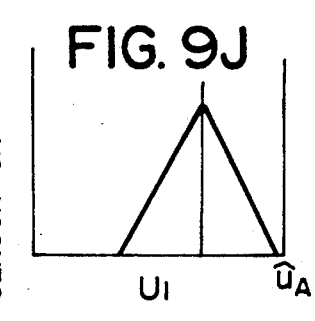

FIG. 10

| FLOW VELOCITY LEVEL | T3k |
|---|---|
| DISTORTED FLOW MODEL | MEAN FLOW RATE CALCULATING EXPRESSION |
| $D_{m1}$ | $f_{1k}$ |
| $D_{m2}$ | $f_{2k}$ |
| ⋮ | ⋮ |
| $D_{mN}$ | $f_{Nk}$ |

$k = (1, 2 \cdots, K)$

FIG. 12

| | $U_{d1}$ | $U_{d2}$ | ---- | $U_{dK}$ |
|---|---|---|---|---|
| $U_1$ | $\zeta_{11} = 1.0$ | $\zeta_{12} = 0$ | ---- | $\zeta_{1K} = 0$ |
| $U_2$ | $\zeta_{21} = 0$ | $\zeta_{22} = 1.0$ | ---- | $\zeta_{2K} = 0$ |
| ⋮ | ⋮ | ⋮ | ---- | ⋮ |
| $U_K$ | $\zeta_{K1} = 0$ | $\zeta_{K2} = 0$ | ---- | $\zeta_{KK} = 1.0$ |

T1

METHOD AND SYSTEM FOR MEASURING FLUID FLOW RATE BY USING FUZZY INFERENCE

BACKGROUND OF THE INVENTION

The present invention relates to a method and a system for measuring a flow rate of a fluid flowing within and through a pipe. More particularly, the invention is concerned with a flow rate measuring method and a system therefor with are capable of determining or measuring stably a mean flow rate of a fluid flowing through a pipe such as tube, conduit or the like in which distorted flows and disturbances such as turbulences may exist.

For measurement of flow rate of a fluid flowing within a pipe, there has heretofore been known a plural-sensor type flow meter system in which a plurality of detection elements (hereinafter referred to as the sensor) are disposed within the pipe and a single-sensor type flow meter system in which only one sensor is installed within the pipe.

As a typical plural-sensor type flow meter, there may be mentioned those disclosed in JU-A-61-1954188 and JP-A-61-120016, respectively. The first mentioned flow meter is based on the concept that the output signals of the individual sensors are integrated for determining stably an approximately true means (average) flow rate by using a calculating circuit of a corresponding structure notwithstanding of presence of distortions or deviations in the flow velocity (i.e. a distorted flow velocity distribution) brought about by geometrical factors (e.g. shapes) of an upstream pipe section, as is disclosed in JU-A-61-195418.

In the single-sensor type flow meter, a single hot wire element is installed within the pipe under tension in order to determine a curvilinear integral (line integral) of a flow velocity for thereby obtain a mean (average) flow rate, as disclosed in JP-A-54-125060.

The plural-sensor type flow meter in which a plurality of sensors are installed within the pipe suffers from a problem that when any one of the sensors is located in a region where flow disturbances due to vortexes, fluidal separations or the like brought about by geometry or shape of the pipe are significant, infinitesimal variations or fluctuations (fluidal noise) of the flow velocity are directly fetched by the mean flow calculating circuit as the input thereto, making it difficult or impossible to obtain the mean flow rate in a stable manner, because weights imparted to the outputs of the individual sensors are selected to be equal to one another or fixed.

The single-sensor type flow meter mentioned above also suffers the similar problem because no measures are taken against the influence of the infinitesimal variations in the flow velocity.

It is further noted that the location where the infinitesimal variation takes place in the fluid flow velocity is movable as a function of change in the distorted flow distribution profile or pattern. Consequently, the mean flow rate calculation using the fixed weight can not stably or consistently assure the availableness of accurate flow rate value by flexibly coping with the infinitesimal variation, giving rise to another problem.

SUMMARY OF THE INVENTION

It is an object of the present invention to provide a flow rate measuring method and a system for carrying out the same which can evade the shortcomings and problems of the techniques mentioned above.

Another object of the present invention is to provide a method and a system for measuring a flow rate which are capable of measuring a true mean flow rate even in the presence of distorted flows and disturbances by using a fuzzy inference and a fuzzy integration in determination and calculation of a mean flow rate of a fluid flowing through a pipe on the basis of outputs of plural sensors installed within the pipe.

In view of the above and other objects which will be more apparent as the description proceeds, there is provided according to a first aspect of the present invention a flow rate measuring method of determining a flow rate of a fluid flowing through a pipe by using a fuzzy inference system which comprises the steps of measuring flow velocities of the fluid at a plurality of locations within the pipe, preparing a table of membership functions indicating grades of fitness of the flow velocities to a distorted flow model distribution, preparing a mean flow rate calculating expression for deriving a flow rate corresponding to the distorted flow model distribution, determining a membership grade of the measured flow velocity to the distorted flow model distribution by referring to the membership function table through the medium of the measured flow velocity, and calculating a weighted mean of the flow rates given by the mean flow rate calculating expression by using as a weight the membership grade to the distorted flow model distribution.

According to another aspect of the invention, there is provided a flow rate measuring system for determining a flow rate of a fluid flowing through a pipe by using a fuzzy inference system which comprises a plurality of flow sensors for measuring flow velocities of the fluid at a plurality of locations within the pipe, a storage containing a first membership function table indicating grades of fitness of a mean value of the flow velocities within the pipe to a plurality of distorted flow velocity levels, respectively, a storage containing a second membership function table indicating grades of fitness of the flow velocities to a plurality of distorted flow model distributions for the flow velocity levels, respectively, a storage containing mean flow rate calculating expressions for deriving flow rates corresponding to the distorted flow model distributions at the flow velocity levels, respectively, a unit for determining a mean value of the flow velocities measured at the plurality of locations within the pipe to thereby determine on the basis of the mean value first membership grades of the mean value to the flow levels, respectively, by reference to the first membership function table through the medium of the mean value, a unit for determining second membership grades of the flow velocity values to the distorted flow model distributions for the flow velocity levels, respectively, by reference to the second membership function table through the medium of the measured flow velocity values, and a unit for calculating a weighted mean of the flow rates given by the mean flow rate calculating expressions, respectively, by using as weights the first and second membership grades, for thereby determining the flow rate of the fluid within the pipe.

The present invention starts from the facts that the flow velocities at various points in a fluid flowing through a pipe exhibit a frequency distribution having a unique mean (average) value and variance due to influences of distorted flows and disturbances and that the frequency distribution profile is characteristically inherent to the geometries of the pipe line and the mean flow velocity prevailing within the pipe.

For calculating the mean flow rate by taking advantage of the characteristics mentioned above, it is proposed as an embodiment of the invention that the detected values outputted from a plurality of sensors disposed within the pipe are made use of as fuzzy variables, wherein software and hardware are so structurized that correspondences are established by the fuzzy inference between or among the fuzzy variables, a membership function table (first membership grade function table) containing information about the levels to which the flow velocities belong, a distorted flow model function table (second membership grade function table) containing distorted flow distribution model patterns and an empirical expression (mean flow rate calculating expression) for determining mean flow rates corresponding to the flow velocity levels and the distorted flow distribution patterns, respectively.

When a distorted flow distribution of a given pattern exists in the vicinity of plural sensors, the fitness grades (similarity grades) or membership grades of the distorted flow distribution to a plurality of distorted flow distribution patterns prepared previously independent of the former are determined by fuzzy arithmetic operation, whereon the mean flow rates which correspond to the distorted flow model patterns, respectively, are determined in accordance with the empirical expressions corresponding to the distorted flow model patterns. Further, by using the membership grades (fitness grades) as weight, a weighted mean value is calculated for the distorted flow model patterns.

By determining the membership grades for the distorted flow model patterns, as mentioned above, it is also possible to calculate mean (average) flow rates for those distorted flow distributions which are deviated from the previously prepared distorted flow model patterns. In this manner, the capability of the flow rate measuring system to cope with variations of the distorted flow distribution can significantly be enhanced. Further, since the mean flow rate is not straightforwardly determined by using directly the output values of the sensors, the mean flow rate as calculated is essentially insusceptible to direct influence of local disturbances taking place around particular sensors. Thus, there can be realized a flow rate measuring system which is highly stabilized against disturbances of the fluid flow under measurement.

BRIEF DESCRIPTION OF THE DRAWINGS

FIG. 5 is a view showing a structure of a flow velocity level membership function table;

FIG. 7 is a view showing a structure of a distorted flow model membership function table;

FIGS. 9A to 9J are views showing frequency distributions of flow velocities in distorted flow model patterns in dependence on particular shapes of pipes;

FIG. 10 shows a structure of a mean flow rate calculating expression table T3;

FIG. 12 shows a structure of the flow velocity level membership function table for illustrating operation of the flow rate measuring system according to a second embodiment of the invention;

DESCRIPTION OF THE PREFERRED EMBODIMENTS

Before entering into detailed description of preferred embodiments of the flow rate measuring method and system according to the present invention, elucidation will first be made of the principle or concept underlying a typical example of the mean flow rate calculation method taught by the invention.

Figure 2A:
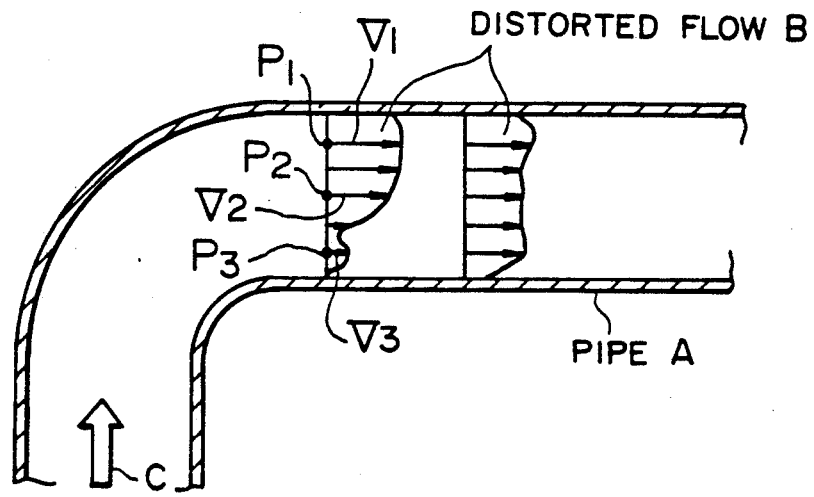
FIG. 2A is a schematic diagram for illustrating distorted flows of a fluid flowing through a pipe.
Figure 2B:
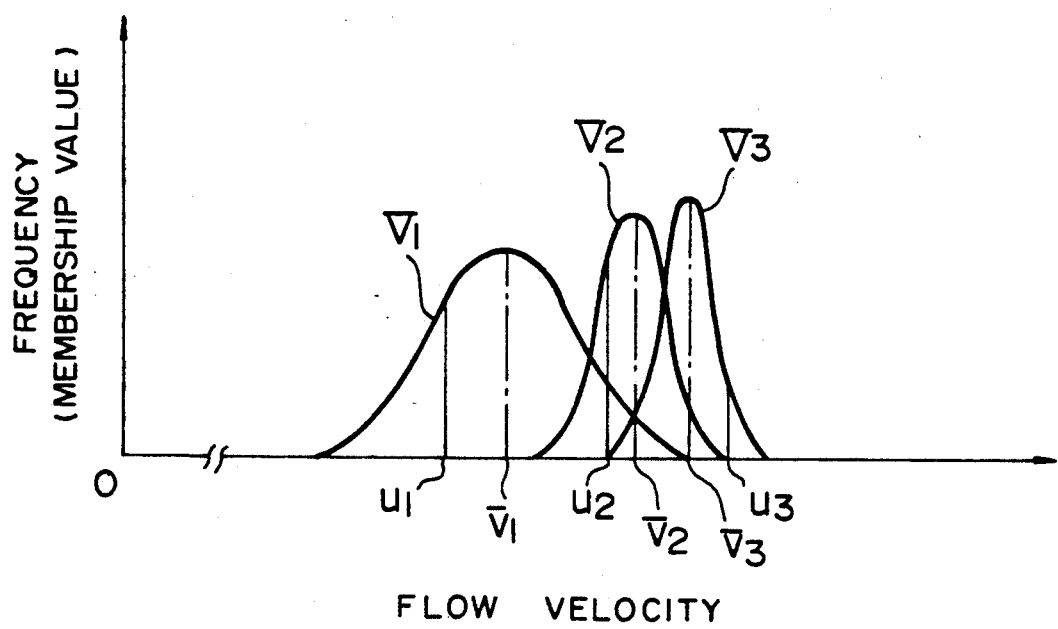
FIG. 2B is a view showing graphically a frequency distribution of distorted flows.

FIG. 2A is a schematic diagram for illustrating generation of distorted flows in a fluid flowing through a pipe. In FIG. 2A, a reference character A denotes generally a pipe, tube or conduit (hereinafter generally referred to as the pipe) through and within which a fluid under measurement flows, and B denotes distorted flows of the fluid brought about within the pipe A under the influence of geometrical factors such as shape of a pipe section located upstream. Further, a reference character C denotes generally a flowing direction of the fluid. Now, let's consider a flow velocity measurement of a fluid flowing through the pipe line A. So long as the mean flow rate of the fluid within the pipe line A is constant, the ideal conditions for the measurement of flow velocities at measuring points $P_1$, $P_2$ and $P_3$ within the pipe A should be such that flow velocity values $u_1$, $u_2$ and $u_3$ measured at the respective measuring points $P_1$, $P_2$ and $P_3$ remain always constant with variance among the frequency distributions of the flow velocity measurement values $u_1$, $u_2$ and $u_3$ being zero. However, in practical flow velocity measurements, the fluid flow is inevitably accompanied with deviations and infinitesimal deviations under the influence of disturbances such as vortexes, fluidal separation and/or the like phenomena taking place upstream of the measuring points as well as under the influence of the geometrical configuration of a pipe section located upstream. As a consequence, the actual flow velocity ($v_1$, $v_2$, $v_3$) exhibits such frequency distributions which differ from one another in respect to the temporal mean values $\bar{v}_1$, $\bar{v}_2$ and $\bar{v}_3$ and variance, as illustrated in FIG. 2B. In this conjunction, it is noted that differences among the temporal mean values of the flow velocities $\bar{v}_1$, $\bar{v}_2$ and $\bar{v}_3$ characteristically represent distribution of distorted flows, while variance at the individual measuring points characterizes the deviation or fluctuation of the flow velocity brought about by the disturbances or turbulences such as vortexes, fluidal separation and/or the like phenomena. When the mean flow rate within the pipe is to be determined on the basis of a plurality of the flow velocity measurement values $u_1$, $u_2$ and $u_3$ exhibiting the distributions described above, it may be conceived to adopt a method of determining a simple mean value of the measured flow velocities $u_1$, $u_2$ and $u_3$ or a method of determining a weighted flow rate mean value ($w_1 v_1 + w_2 v_2 + w_3 v_3$) by weighting the measured flow velocities $u_1$, $u_2$ and $u_3$ with coefficients $w_1$, $w_2$ and $w_3$, respectively, which can be derived from Reynolds number (Re) representing an approximate value of the mean flow rate by taking into account the geometrical configuration of the flow path and other factors. However, the simple mean method is disadvantageous in that fluctuations or small excursions will inevitably be included admixelly in the mean value as determined, because no consideration is paid to variance of the flow velocity due to the infinitesimal variation of fluctuation of the flow velocity. On the other hand, the weighted mean method will encounter difficulty in determining definitely the distribution of distorted flows because of the variance of the flow velocity, which in turn means that it becomes difficult to determine evaluation coefficients related to the distribution profile or pattern of the distorted flows which are to be taken into consideration in determinating the applicable or pertinent weights $w_1$, $w_2$ and $w_3$.

At this juncture, there may be mentioned two main factors which make it difficult to calculate the mean flow velocity. They are:

(1) fuzziness of the mean flow rate brought about by variations in the mean flow rate level within the pipe, and (2) fuzziness of the mean flow rate due to variance in the flow velocity measurement values due to the distorted flow distribution and the disturbances such as mentioned above.

Accordingly, by resorting to the use of a fuzzy inference method for determining the mean flow velocity level and the profile or pattern of the distorted flow distribution to thereby take into account the fuzziness in determination of the weighting coefficients mentioned above, it is believed to make steady (or stabilize) the calculation of the average or mean flow rate, as will be described below in detail.

Figure 3:
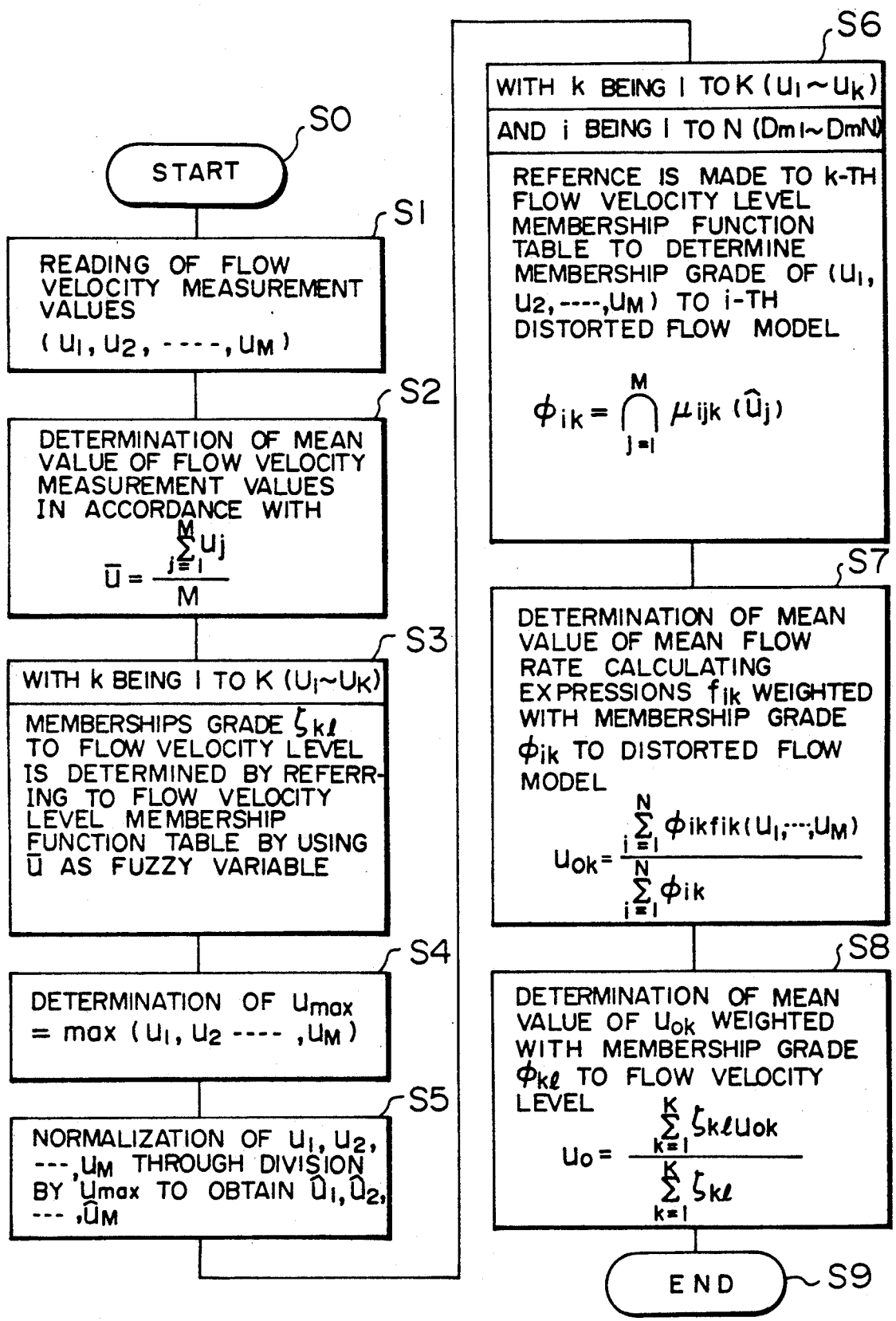
FIG. 3 is a flow chart for illustrating a typical example of procedure for calculating a mean flow rate according to the teaching of the present invention.

Representing in general by M the number of points at which the fluid flow velocity is to be measured, description will be made on a method of determining the mean flow velocity level by resorting to a fuzzy inference method. FIG. 3 is a flow chart illustrating a typical procedure for calculating a mean fluid flow rate by resorting to a fuzzy inference method according to an embodiment of the invention.

Referring to FIG. 3, execution of the procedure starts from a step S0. In a step S1, detected or measured flow velocity values $u_1$, $u_2$, ..., $u_M$ are fetched from flow sensors disposed at the measuring points $P_1$, $P_2$, ..., $P_M$, respectively. Subsequently, in a step S2, a flow velocity mean (average) value $\bar{u}$ of $u_1$, $u_2$, ..., $u_M$ is determined on the basis of the flow velocity measurement values $u_1$, $u_2$, ..., $u_M$ in accordance with $$\bar{u} = \sum_{j=1}^{M} u_j/M \tag{1}$$

Next, in a step S3, a flow velocity measurement value range corresponding to a flow velocity classification range to which the mean velocity of the fluid flow within the pipe A belongs and a distorted flow model membership function table bearing a strongest or best correspondence relation to the mean flow velocity are determined on the basis of the abovementioned mean flow velocity value $\bar{u}$ in accordance with the following expression (2).

$$IF(\bar{u} \in U_{dl}) THEN \zeta = \zeta_{kl} \tag{2}$$

where k represents a constant in a range of 1, ..., K, $U_{dl}$ represents a flow velocity classification range to which the mean flow velocity value $\bar{u}$ belongs, and l represents a specified or particular range of flow velocity measurement values.

In order to allow the distributions of distorted flows to be handled as fuzzy variables, the flow velocity measurement values $u_1$, $u_2$, ..., $u_M$ are divided by a maximum flow velocity value $u_{max}$ given by $$u_{max} = max(u_1, u_2, ..., u_M) \tag{3}$$

to thereby obtain normalized flow velocity measurement values ($\hat{u}_1$, $\hat{u}_2$, ..., $\hat{u}_M$) (steps S4 and S5).

Subsequently, in a step S6, it is determined on the basis of N fuzzy inference rules mentioned below which of the distorted flow model patterns the normalized flow velocity measurement values $\hat{u}_1$, $\hat{u}_2$, ..., $\hat{u}_M$ bears the best similarity of fitness (membership grade). The N fuzzy inference rules are prepared in correspondence to specific flow velocity levels. More specifically, N distorted flow model patterns are combined with plural (M) flow velocity measurement values in the form of a table (refer to, for example, FIG. 7), whereon membership grades or fitness grades (membership function values) are allocated to the abovementioned combinations, respectively.

Expressing mathematically,

IF
$(\hat{v}_1 \cdot EQ \cdot V_{i1k},$
$\hat{v}_2 \cdot EQ \cdot V_{i2k},$
$\vdots$
$\hat{v}_M \cdot EQ \cdot V_{iMk})$ THEN
$$v = f_{ik}(v_{ik}(v_1, v_2, ..., v_M)) \tag{4}$$

where $i = 1, 2, ..., N$, and $k = 1, 2, ..., K$.

In the above expression (4), $\hat{v}_1$, $\hat{v}_2$, ..., $\hat{v}_M$ are fuzzy variables representing typically the flow velocity measurement values obtained at the sensor locations or measuring points $P_1$, $P_2$, ..., $P_M$ within the pipe, which are normalized by the method described previously, and $V_{i1k}, V_{i2k}, \ldots, V_{iMk}$ are fuzzy variables representing the fuzziness of the flow velocity distributions at the abovementioned sensor locations $P_1, P_2, \ldots, P_M$, respectively, which are derived from the frequency distributions of flow velocities at the sensor locations at a given level of the mean flow velocity within the pipe and normalized through division by a maximum distribution frequency. Further, $f_{ik}$ represents a functional expression for calculating the mean flow rate within the pipe on the basis of the flow velocity measurement values $(u_1, u_2, \ldots, u_M)$, wherein the functional expression may include empirical rules or expressions. More specifically, $f_{ik}$ represents an expression for calculating the mean flow rate corresponding to the maximum distribution frequency in the distorted flow distributions as the i-th fuzzy inference rule.

In the expression (4), "IF" part is referred to as the condition part with "THEN" part as the conclusion part. Notation ".EQ." does not represent equality of values but represents an arithmetic operation for checking the membership grade of the fuzzy variable $\hat{v}$ to the fuzzy variable V, which will be described below in detail.

It is now assumed that the flow velocity measurement value $u_1$ detected at the measuring point $P_1$ is outputted at a given time point. In that case, the membership function indicating to what extent the flow velocity measurement value $u_1$ contributes to validation of the condition part, i.e. the grade of equality or fitness of the value $u_1$ to the fuzzy variable $V_{ik}$ is represented by $\mu_{li}(\hat{u}_1)$, where $\hat{u}_1$ represents the normalized flow velocity measurement value at the measuring point $P_1$. Further, the membership function of the condition part for the flow velocity measurement value $(u_1, u_2, \ldots, u_M)$ is defined as follows:

$$\phi_{ik} = \bigcap_{j=1}^{M} \mu_{ijk}(u_1) \tag{5}$$

where a symbol "⌒" represents an operand indicating that the membership function assumes a minimum value. On these conditions, it is possible to determine with the expression (4) to what extent the flow velocity distribution of the measurement values $(u_1, u_2, \ldots, u_M)$ bears "similarity or fitness" to the distorted flow model pattern classified as the i-th distorted flow model pattern, when judged on the basis of M flow velocity measurement values $u_1, \ldots, u_M$, wherein $\phi_{ik}$ given by the expression (5) indicates the extent or grade of "similarity or fitness", i.e. the membership grade. In this connection, a minimum value of the term $\mu_{ijk}$ appearing in the expression (5) means that the similarity or membership grade is evaluated on the severer conditions. Through similar procedure, the membership grades $\phi_{ik}$ are determined for N inference rules, respectively, whereon the mean flow rate within the pipe is calculated in accordance with the following expression:

$$u_{0k} = \frac{\sum_{i=1}^{N} \phi_{ik} f_{ik}(u_1, u_2, \ldots, u_M)}{\sum_{i=1}^{N} \phi_{ik}} \tag{6}$$

where $k = 1, 2, \ldots, K$.

The above expression (6) equivalently means that values determined in accordance with the mean flow rate calculating function $f_{ik}$ are averaged by weighting the values with the similarity or fitness grade (membership grade) $\phi_{ik}$ for the i-th distorted flow model pattern $(D_{mi})$ of the flow velocity measurement values $(u_1, u_2, \ldots, u_M)$ at the k-th flow velocity level $U_k$.

Next, on the basis of the mean flow rate $u_{0k}$ determined as described above, a mean value $u_0$ is determined in accordance with the undermentioned expression (7) by using as the weight the membership grade $\zeta_{kl}$ for the k-th flow level determined previously (a step S8), whereon the calculation processing comes to an end (step S9).

$$u_0 = \frac{\sum_{k=1}^{K} \zeta_{kl} u_{0k}}{\sum_{k=1}^{K} \zeta_{kl}} \tag{7}$$

In determination of the mean flow rate in accordance with the above expression (7), the weights $\zeta_k$ for the individual flow velocity levels and the weights for the membership grades to the individual distorted flow model patterns are synthetically taken into consideration, which in turn means that inference of the mean flow rates for intermediate distorted flow distributions which are not contained in the distorted flow model pattern classification table can be realized as well. Further, by virtue of the nature of the fuzzy inferences given by the expressions (4) and (5), unwanted influence to the inferred value of the mean flow rate can be mitigated even when any one of the flow velocity measurement values exhibits significant fluctuations due to the disturbances, because the membership grade (weight) $\phi_i$ is decreased correspondingly.

Now, the present invention will be described in detail and concrete in conjunction with preferred or exemplary embodiments thereof.

Figure 1:
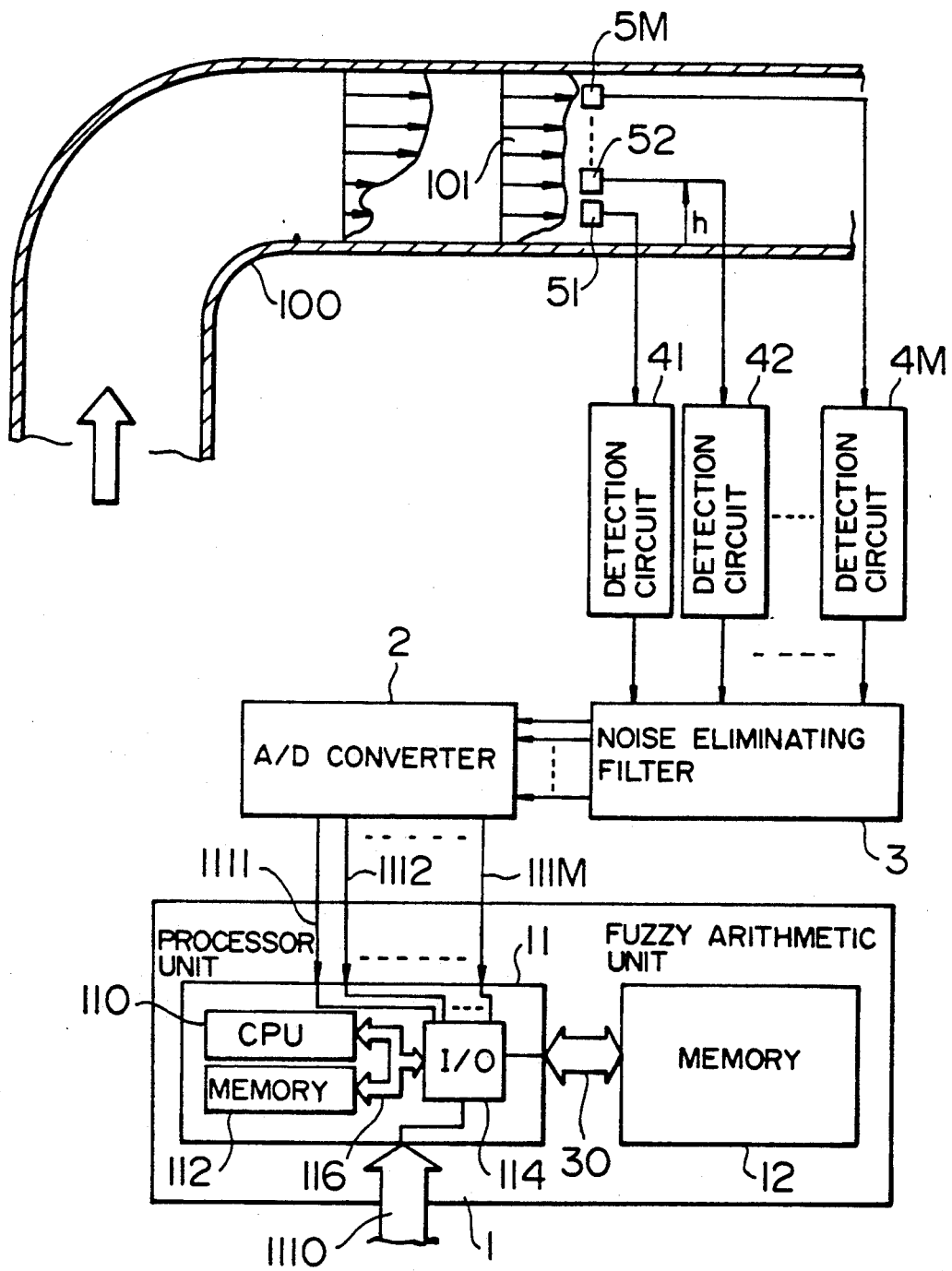
FIG. 1 is a block diagram showing schematically a general arrangement of a flow rate measuring system according to a first embodiment of the present invention.
Figure 15:
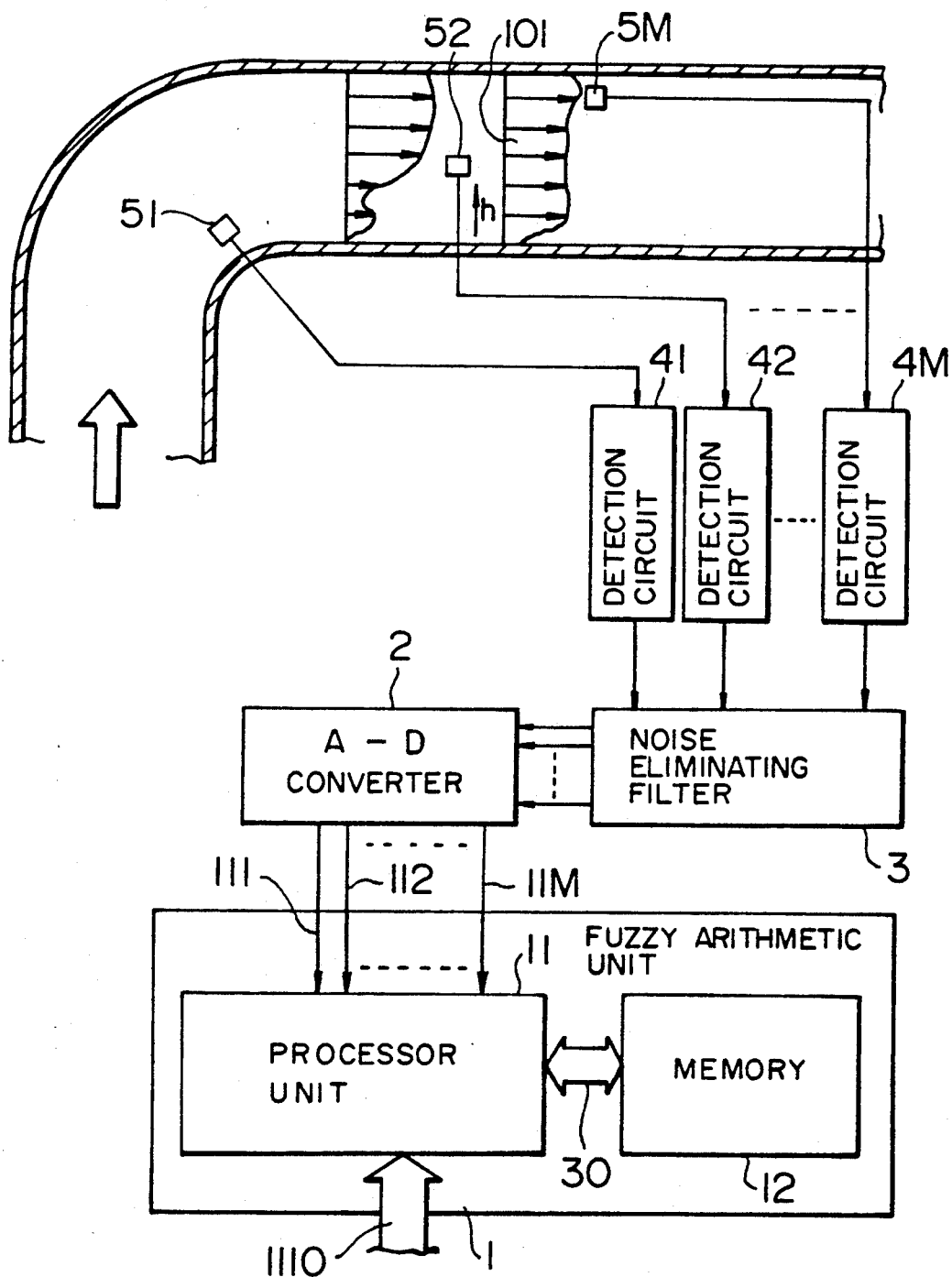
FIG. 15 is a view showing another example of installation of sensors within a pipe.

FIG. 1 is a block diagram showing schematically a general arrangement of a flow rate measuring system according to a first embodiment of the invention. In this figure, a reference numeral 1 denotes a fuzzy arithmetic (operation) unit which incorporates therein a processor unit 11 and a memory 12, wherein the processor unit 11 and the memory 12 are interconnected through an interface 30 so as to allow data transfer therebetween. The memory 12 may be constituted by a random access memory or a read-only memory. On the other hand, the processor unit 11 includes a central processing unit (CPU) 110, a memory 112, an input/output (I/O) circuit 114 and a bus 116 and is in charge of overall control of the whole system. Further, the processor unit 11 is provided with a data bus 1110 for outputting externally the results of calculations. Additionally, there are provided for the processor unit 11 input terminals 1111, 1112, ..., 111M which are connected to plural (M in the illustrated embodiment) sensors 51, 52, ..., 5M, respectively, by way of an analogue-to-digital (A/D) converter 2, a noise eliminating filter 3 and respective detection circuits 41, 42, ..., 4M so that the processor unit 11 can fetch data from the sensors 51, 52, ..., 5M, respectively. The sensors 51, 52, ..., 5M are disposed within a pipe 100 through which a fluid flows at the locations appropriate for detecting distorted flows generally denoted by a reference numeral 101. In this conjunction, it should be mentioned that the sensors 51, 52, ..., 5M may be disposed on a same plane as shown in FIG. 1 or on mutually different planes as illustrated in FIG. 15 on the condition that these sensors are positioned at different heights h.

The sensors 51, 52, ..., 5M are constituted by an element capable of detecting a change in a physical quantity (hereinafter referred to as the physical change) brought about by motion or kinematic behavior of the fluid in which the sensors are immersed and may each be constituted by a pressure sensor, a thermistor, a hot wire anemometer or the like. The detection circuits 41, 42, ..., 4M serve for function to convert the physical changes detected by the sensors 51, 52, ..., 5M into electric signals, respectively. To this end, detection circuit may be constituted by a commercially available unit selected to conform with the characteristics of the sensor. It should further be mentioned that the sensors 51, 52, ..., 5M may be of such type as to operate on mutually different principles with the detection circuits 41, 42, ..., 4M being then adapted to operate on correspondingly different principles.

The signals detected by the detection circuits 41, 42, ..., 4M are inputted to the noise eliminating filter 3 through which high frequency noise components such as electric noise, thermal noise and others are eliminated. Output signals from the filter 3 are converted into digital signals by the A/D converter 2 to be subsequently supplied to the fuzzy arithmetic unit 1.

Through the signal transmission path mentioned above, the flow signals detected by the sensors 51, 52, ..., 5M are applied to the input terminals 1111, 1112, ..., 111M as the signals which can discriminatively be identified from one another.

Figure 4:
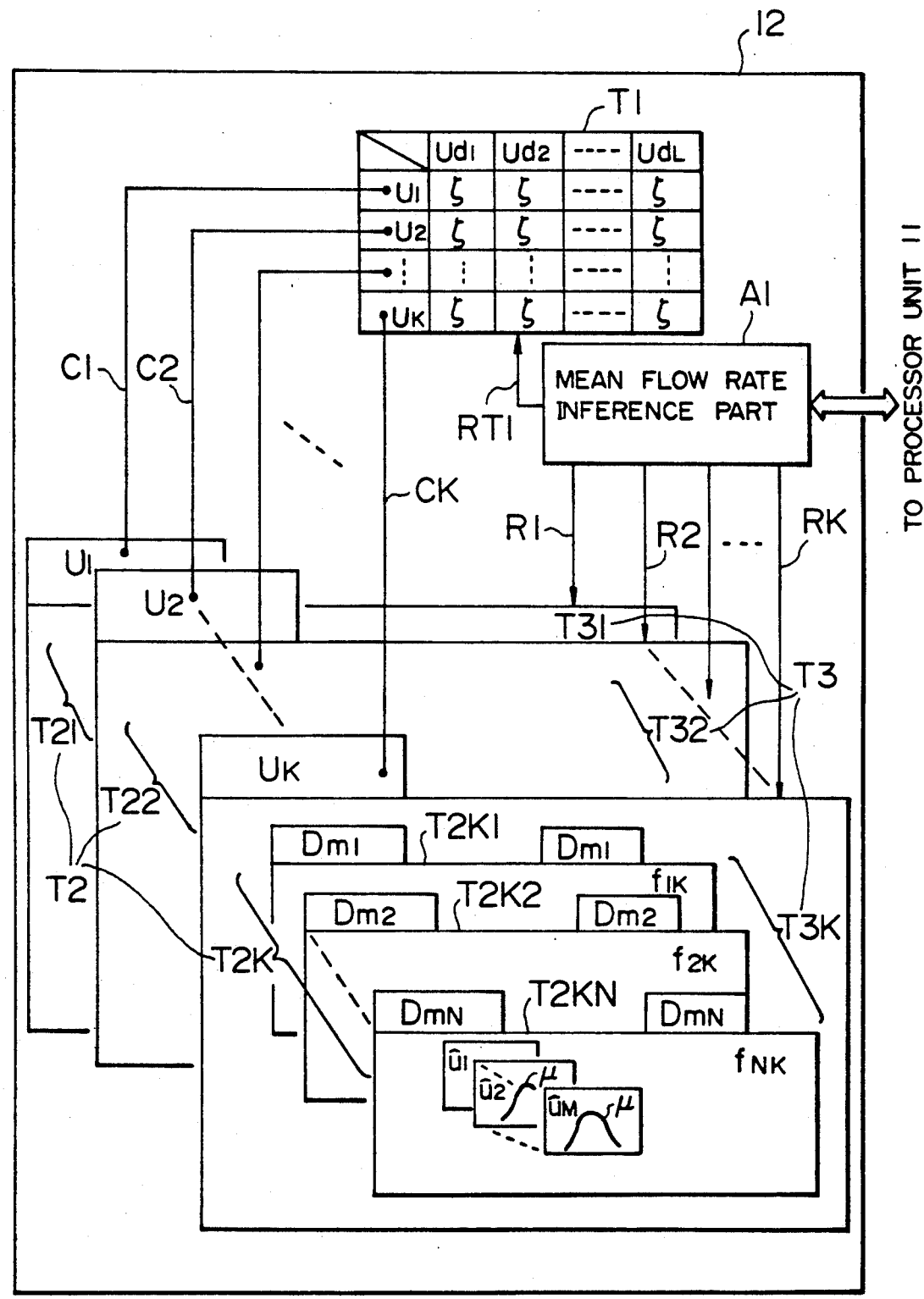
FIG. 4 is a view showing an internal structure of a memory used for fuzzy inference of the mean flow rate.

Implemented in the memory 12 are a mean (average) flow rate inference part incorporating inference procedure and tables which are required for the processor 11 to perform fuzzy inference of the mean flow rate within the pipe A on the basis of the signals applied to the input terminals 1111, 1112, ..., 111M. FIG. 4 is a view showing an internal structure of the memory 12. Referring to the FIG. 4, there are prepared in the memory 12 distorted flow model membership function tables T2 (see FIG. 7) which are required for allowing the profiles of distorted flow distributions to be handled as the fuzzy variables, a flow velocity level membership function table T1 (FIG. 5) for inferring approximately a flow velocity range of interest, mean flow rate calculating expression tables T3 (FIG. 10) for calculating the mean flow rate in correspondence to the distorted flow model pattern determined through the inference (FIG. 10) and a mean flow rate inference memory part A1 for storing fuzzy inference procedures. In more concrete, the mean flow rate inference memory part A1 stores therein the conditional decision statements and the inference expressions (1) to (7) described hereinbefore.

FIG. 5 shows a structure of the flow velocity membership function table T1. Referring to the figure, symbols $U_{d1}, U_{d2}, \ldots, U_{dL}$ entered in the topmost row of the table represent, respectively, specified or particular flow velocity ranges resulting from classification of the mean values of the measured flow velocities. On the other hand, symbols $U_1, U_2, \ldots, U_K$ in the leftmost column of the table represent flow velocity levels for establishing correspondence of the abovementioned flow velocity ranges to the distorted flow model membership function tables T2. Further, $\zeta_{kl}$ ($k=1, \ldots, K$ and $l=1, \ldots, L$) represent membership function values for establishing relations between the flow velocity levels and the distorted flow model membership function tables T2.

Figure 6A:
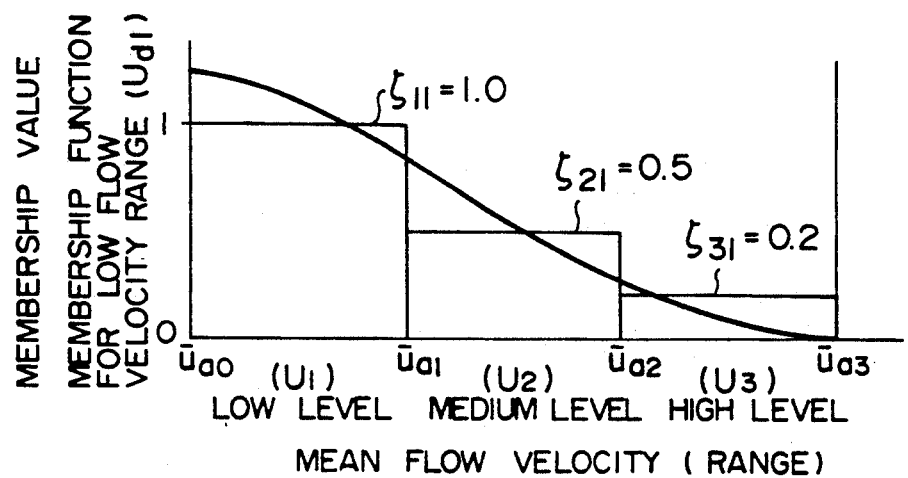
FIGS. 6A to 6C are views showing frequency distributions at different flow velocity levels for illustrating the contents of the table shown in FIG. 5.
Figure 6B:
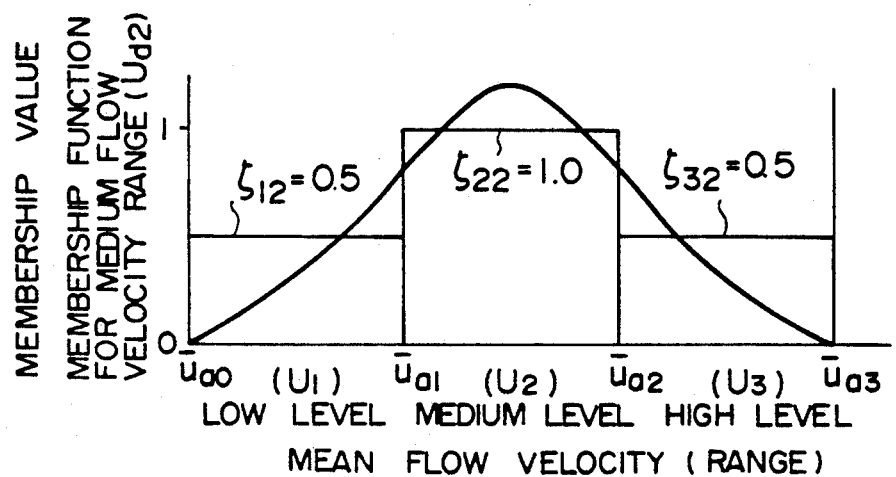
Figure 6C:
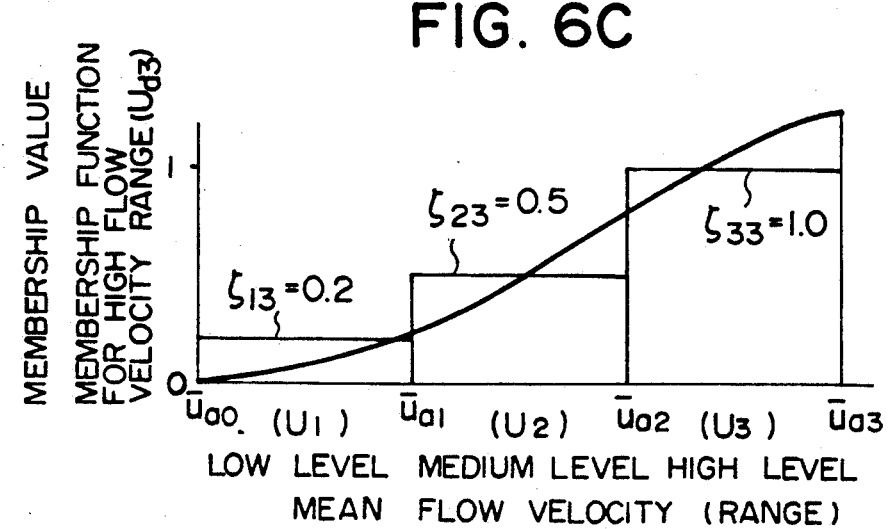

FIGS. 6A to 6C are views for illustrating, by way of example, the contents of the flow velocity membership function table shown in FIG. 5. In these figures, there are graphically illustrated the flow velocity membership functions in three different flow velocity ranges $U_{d1}, U_{d2}$ and $U_{d3}$ into which the mean values $\bar{u}$ of the flow velocity measurement values $u_1, \ldots, u_m$ derived from the outputs of the sensors 51, 52, ..., 5M are classified (L thus being equal to three). They are a low flow velocity range $U_{d1}$ ($\bar{u}_{d0} \leq \bar{u} \leq \bar{u}_{d1}$), a medium flow velocity range $U_{d2}$ ($\bar{u}_{d1} < \bar{u} \leq \bar{u}_{d2}$) and a high flow velocity range $U_{d3}$ ($\bar{u}_{d2} < \bar{u} \leq \bar{u}_{d3}$). Referring to FIGS. 6A, 6B and 6C, taken along the abscissae are three flow velocity levels $U_1$, $U_2$ and $U_3$, respectively, into which the mean flow velocity $\bar{u}$ is classified (with $k=3$), i.e. a low flow velocity level $U_1$ ($\bar{u}_{a0} \leq \bar{u} \leq \bar{u}_{a1}$), a medium flow velocity level $U_2$ ($\bar{u}_{a1} < \bar{u} \leq \bar{u}_{a2}$) and a high flow velocity level $U_3$ ($\bar{u}_{a2} < \bar{u} \leq \bar{u}_{a3}$), while taken along the ordinates the membership values (fitness or membership grades) $\zeta_{kl}$ of the flow velocity levels $U_1$, $U_2$ and $U_3$ in the flow velocity ranges $U_{d1}, U_{d2}$ and $U_{d3}$, respectively. It will be appreciated that the flow velocity level membership function table shown in FIG. 5 contains the membership grades (fitness grades) $\zeta_{kl}$ of the flow velocity levels shown in FIGS. 6A, 6B and 6C in the flow velocity ranges $U_{d1}$ to $U_{dL}$ ($L=3$ in this case), respectively. In this manner, when the flow velocity mean value $\bar{u}$ belongs to or falls within the low flow velocity range $U_{d1}$, the membership grades $\zeta_{11}$, $\zeta_{21}$ and $\zeta_{31}$ of the flow velocity levels $U_1$, $U_2$ and $U_3$ can be determined to be, for example, 1.0, 0.5 and 0.2, respectively, from the table content shown in FIG. 6A. Parenthetically, data illustrated in FIGS. 6A to 6C are only for the illustrative purpose. It will be understood that L and K may assume given positive integers, respectively.

FIG. 7 shows a typical structure of the distorted flow model membership function tables T2. Referring to this figure, the distorted flow model membership function tables T1 includes K tables T21 to T2K which correspond to the flow velocity ranges $U_1$ to $U_k$, respectively, which are contained in the flow velocity level membership function table T1, as can be seen in FIG. 4. Shown in FIG. 7 is one of these distorted flow model membership function tables T21 to T2K, e.g. the table T2k for the flow velocity level $U_k$ (k is an integer in a range given by $1 < k < K$). In the table shown in FIG. 7, symbols $\hat{u}_1, \hat{u}_2, \ldots, \hat{u}_M$ in the topmost row represent normalized values of the flow velocity measurement values detected by the sensors 51, 52, ..., 5M, respectively. On the other hand, symbols $D_{m1}, D_{m2}, \ldots, D_{mN}$ in the leftmost column represent distorted flow model patterns used for classification of the distorted flow distribution profiles. Further, symbols $\mu_{ijk}$ (where $i=1, \ldots, N$ and $j=1, \ldots, M$) represent the membership function values used for determining the membership grades of M flow velocity measurement values to the abovementioned distorted flow model patterns, respectively. As a concrete example of the method for preparing the membership grades $\mu_{ijk}$, it is conceivable to describe them in the form of interpolation functions by making use of the frequency distribution of the flow velocity measurement values experimentally determined previously or utilize approximate function for approximating the mean values and variances of the flow velocity distributions as the representative parameters by using a Gaussian curve and storing the functions as subroutines. In this case, it is necessary to normalize the membership function values by dividing the flow velocity frequency distributions with a maximum frequency thereof in conformance with the definition of the membership function.

Figure 8A:
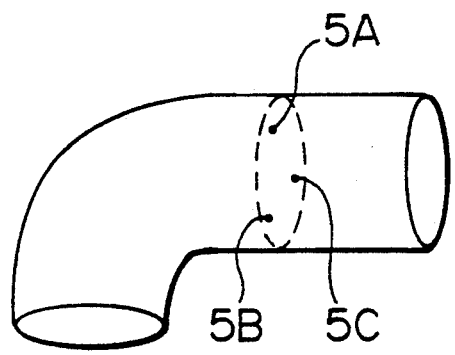
FIGS. 8A to 8C show three exemplary configurations of pipe sections through which a fluid under measurement flows.
Figure 8B:
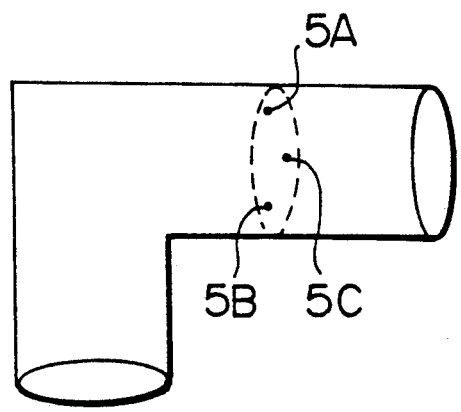
Figure 8C:
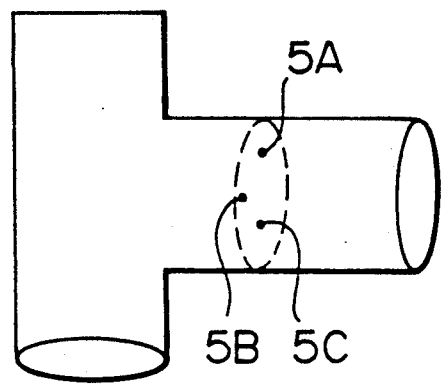

Now, description will be made of the distorted flow model membership function for preparing the distorted flow model membership function table T2. FIGS. 8A to 8C show three typical configurations of the flow path which are located upstream of the sensors and which provide causes for the generation of plural (three) basic distorted flow models. In this case, it is assumed, by way of example, that three flow sensors 5A, 5B and 5C are installed.

FIGS. 9A to 9I are views for illustrating membership functions of the normalized values $\hat{u}_A$, $\hat{u}_B$ and $\hat{u}_C$ of flow velocity measurement values $u_A$, $u_B$ and $u_C$ outputted by the individual sensors 5A, 5B and 5C in response to a distorted flow model $D_{m1}$ generated by a bent pipe having a configuration shown in FIG. 8A. Parenthetically, the distorted flow model is determined in dependence on the type of fluid of interest, the geometrical shape of the pipe or conduit, diameter thereof and so forth. Of the figures, FIGS. 9A to 9C illustrate membership functions at a low flow velocity level $U_1$ resulting from classification of the flow velocity into, for example, three levels, FIGS. 9D to 9F illustrate membership functions at an intermediate flow velocity level $U_2$ and FIGS. 9G to 9I illustrate membership functions at a high flow velocity level $U_3$. As will be seen in these figures, when the mean flow rate $\bar{u}$ corresponds to the low flow velocity level $U_1$, the membership value (i.e. fitness or membership grade) $\mu_{1A1}$ corresponding to the normalized value $\hat{u}_{AO}$ of the flow velocity measurement value $u_A$ detected by the sensor 5A is determined to be $\mu a$ from the graph shown in FIG. 9A. In this way, the table T2K includes sub-tables containing the membership function values of the normalized flow velocity measurement values $\hat{u}_1, \ldots, \hat{u}_M$ available from the outputs of the sensors 51, 52, ..., 5M for the distorted flow models $D_{m1}, D_{m2}, \ldots, D_{mN}$ for a flow velocity model $U_k$. The other tables $T_{21}$ etc. can be prepared in the similar manner.

It should here be mentioned that in place of the discrete membership function values shown in FIGS. 9A to 9I, linear interpolation functions such as one shown in FIG. 9J may be employed.

FIG. 10 shows a structure of the mean flow rate calculating expression table T3. This table includes K tables T31 to T3k which correspond to the flow velocity levels $U_1$ to $U_k$ in the table T1, as can be seen in FIG. 4. Of these tables, FIG. 10 shows, by way of example, a table T3k (where k represents an integer in a range given by $1<k<K$) for the flow velocity level $U_k$. Each of the flow rate calculating expression tables T31 to T3k contains the mean flow rate calculating expressions $f_{ik}$ ($i=1,\ldots,N$ and $k=1,\ldots,K$) for determining the mean flow rate from the flow velocity measurement values $(u_1, u_2, \ldots, u_n)$ for the distorted flow model patterns $D_{m1},\ldots,D_{mN}$ at the flow velocity levels $U_1,\ldots,U_K$, respectively. The expression $f_{ik}$ may be stored in the form of interpolation function by using a polynomial of the flow velocity measurement values $(u_1, u_2, \ldots, u_M)$ for the basic distorted flow models at the flow velocity levels, respectively, so that the flow rate having the maximum distribution frequency can be calculated.

The expression $f_{ik}$ may be given, for example, as follows:

$$f_{ik} = a_{ik}u_1 + b_{ik}u_2 + c_{ik}u_3 + \ldots$$

where $a_{ik}$ and $b_{ik}$ represent coefficients determined for every distorted flow model in the tables T31 to T3K.

Next, referring to FIG. 4, description will be made on mutual relations between the flow velocity membership function table T1, the distorted model membership function tables T2 and the mean flow rate calculating expression tables T3 as well as a data structurizing method. The distorted flow model membership function table T2 is divided or classified into plural (K) function tables T21, T22, ..., T2K. Similarly, the mean flow rate calculating expression table T3 is classified into plural (K) mean flow rate calculating expression tables T31, T32, ..., T3K. These K function tables T2 and K expression tables T3 correspond to the flow velocity levels $U_1, U_2, \ldots, U_K$ resulting from division of the flow level by K, respectively. In FIG. 4, lines C1, C2, ..., CK represent the abovementioned correspondence relations, respectively. In the flow velocity level membership function table T1, correspondences are established between the measured flow velocity ranges $U_1, U_2, \ldots, U_L$ and the function tables T21, T22, ..., T2K and the calculating expression tables T31, T32, ..., T3K through the medium of the weights $\zeta_{kl}$. Further, each of the distorted model membership function tables T21, T22, ..., T2K is divided into plural (N) distorted flow model patterns, wherein each of the distorted flow model patterns include M membership functions so as to be referred to for each of the measurement flow velocity values derived from the plural (M) sensor locations. Let's consider, for example, the table T2K shown in FIG. 4. This table T2K includes plural or N tables T2K1, T2K2, ..., T2KN, wherein the table T2KN contains plural or M distorted flow model membership functions $\mu_{Nmk}$ (where $m=1, \ldots, M$) with correspondences being established between each of the mean flow rate calculating expression tables T31, T32, ..., T3K and each of the plural (N) distorted flow model patterns. The table T3K, for example, includes plural or N mean flow rate calculating expressions $f_{ik}$ (where $i=1, \ldots, N$).

The mean flow rate inference part A1 is designed to infer the mean flow rate of a fluid flowing through a pipe in accordance with inference procedure incorporated therein by referring to the flow velocity level membership function table T1, the distorted flow model membership function tables T2 and the mean flow rate calculating expression tables T3 structured as described above. In FIG. 4, an arrow RT1 indicates that the mean flow rate inference part A1 refers to the flow velocity level membership function table T1, and arrows R1, R2, ..., RK indicate that the mean flow rate inference part A1 refers to the distorted flow model membership function tables T2 and the mean flow rate calculating expression tables T3.

Figure 11:
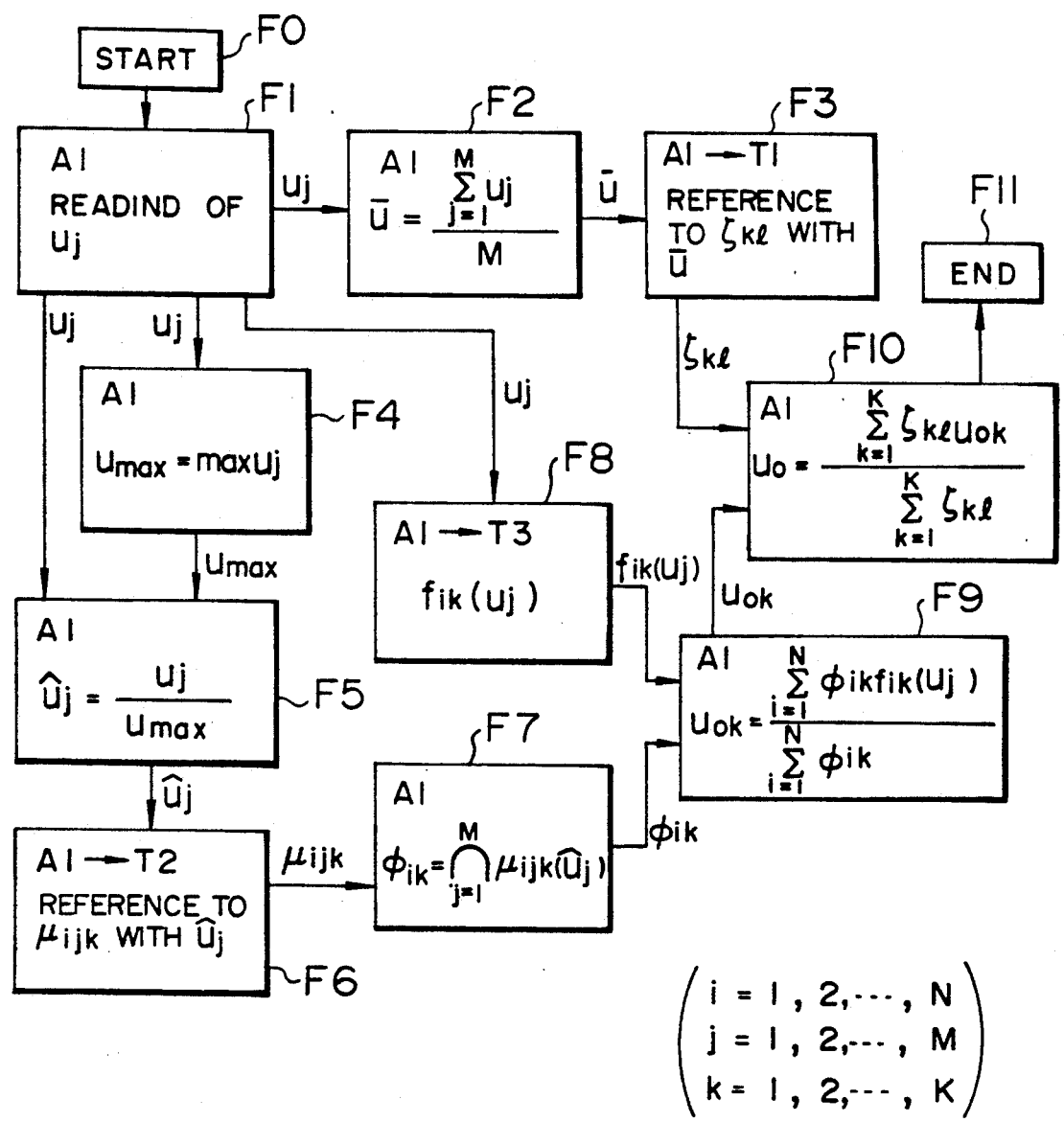
FIG. 11 is a flow chart for illustrating an inference procedure executed by a mean flow rate inference part of the system.

FIG. 11 is a functional block diagram of a calculating or computing system for illustrating a procedure through which the mean flow rate inference part A1 infers the mean flow velocity as well as interdependence relations among variables. In the figure, arrows indicate the interdependence relations among the variables. A notation "A1→T1" represents that the mean flow rate inference part A1 refers to the flow velocity level membership function table T1. Similarly, symbols "A1→T2" and "A1→T3" represent reference of the tables T2 and T3 by the inference part A1, respectively. Since description has already been made on the method of determining the mean flow rate, the following description will be directed to the arithmetic operation procedure of the mean flow rate inference part A1 with emphasis being put on the manner in which the mean flow rate inference part A1 refers to the flow velocity level membership function table T1, the distorted flow model membership function tables T2 and the mean flow rate calculating expression tables T3. For simplification of the description, the mean flow rate inference part A1 is simply termed the inference part A1, while the flow velocity level membership function table T1, the distorted flow model membership function table T2 and the mean flow rate calculating expression table T3 are simply called as the tables T1, T2 and T3, respectively. In FIG. 11, symbols F0 to F11 denote step identifiers.

Now referring to FIG. 1, the inference part A1 starts operation at a step F0.

At a step F1, the inference part A1 fetches the flow velocity measurement values $(u_1, \ldots, u_M)$ from the sensors $51, \ldots, 5M$ through the I/O circuit 114 and the input terminals $1111, \ldots, 111M$ (corresponding to the step S1 in FIG. 3).

At a step F2, the inference part A1 determines the mean value $\bar{u}$ of the flow velocity measurement values $(u_1, u_2, \ldots, u_M)$ in accordance with the expression (1) (refer to the step S2 shown in FIG. 3).

At a step F3, the inference part A1 refers to the table T1 to thereby determine K membership grades $\zeta_{kl}$ corresponding to the measured flow rate range $U_{dl}$ (where l represents one of 1 to L and $k=1, \ldots, K$) to which the mean value $\bar{u}$ belongs (corresponding to the step S3 shown in FIG. 3).

At a step F4, the inference part A1 determines the measured flow velocity maximum value $u_{max}(u_1, u_2, \ldots, u_M)$ (corresponding to the step S4 in FIG. 3).

At a step F5, the inference part A1 calculates the normalized flow velocity measurement values $\hat{u}_1, \ldots, \hat{u}_M$ in accordance with $\hat{u}_j = u_j/u_{max}$ (where $j=1, \ldots, M$) (corresponding to the step S5 in FIG. 3).

At a step F6, the inference part A1 refers to the table T2 to determine the membership function values $\mu_{ijk}$ on the basis of the values $\hat{u}_1, \hat{u}_2, \ldots, \hat{u}_M$ for every distorted flow model patterns $D_{m1}, D_{m2}, \ldots D_{mN}$ at the flow velocity levels $U_1, U_2, \ldots, U_k$ (where $i=1, \ldots, N, j=1, \ldots, M$ and $k=1, \ldots, K$).

At a step F7, the inference part A1 calculates the membership grades $\phi_{ik}$ for every distorted flow model patterns $D_{m1}, D_{m2}, \ldots, D_{mN}$ at a flow velocity level $U_k$ in accordance with $$\phi_{ik} = \prod_{j=1}^{M} \mu_{ijk}(u_j)$$

where $i=1, \ldots, N$, and $j=1, \ldots, M$ (refer to the step S6 in FIG. 3).

At a step F8, the inference part A1 refers to the table T3 to determine the mean flow rate calculating expressions $f_{ik}$ for every distorted flow model pattern $D_{m1}, D_{m2}, \ldots, D_{mN}$ at a given flow velocity level $U_k$ (where $i=1, \ldots, N$, and $k=1, \ldots, K$).

At a step F9, the inference part A1 determines the mean value $u_{0k}$ from the expressions $f_{ik}$ weighted with the membership grade $\phi_{ik}$ in accordance with the inference equation (6) (corresponding to the step S7 in FIG. 3).

At a step F10, the inference part A1 determines the mean values $u_{0k}$ for all the flow velocity levels $U_1, \ldots, U_K$ by repeating the steps F7 to F9 and calculates the mean value $u_0$ from the mean values $u_{0k}$ weighted with the membership grades $\zeta_k$ in accordance with the inference equation (7). The mean value $u_0$ thus determined is supplied to the processor unit 11.

At a step F11, the arithmetic operation of the inference part A11 comes to an end.

Parenthetically, it should be added that in the first embodiment of the invention described above, the number of the distorted flow model patterns may be one (i.e. $N=1$).

Next, a second embodiment of the invention will be described.

In conjunction with software internal structure shown in FIG. 4, it should be mentioned that the mean flow rate can be inferred by using only the distorted flow model membership function tables T2 while omitting reference to the flow velocity level membership function table T1 without need for modifying the inference expressions of the inference part A1 shown in FIG. 4. In essence, this corresponds to that L is set to equal K in the flow velocity level membership function table T1 shown in FIG. 5, wherein $$\zeta_{kl} = 1 \ (k = l) \qquad (8)$$

$$\zeta_{kl} \neq 1 \ (k \neq l)$$

FIG. 12 shows a corresponding structure of the flow velocity level membership function table T1. In practice, however, upon execution of the mean flow rate inference by the processor unit 11, it is required to replace the conditional decision statement given by the expression (2) contained in the mean flow rate inference part A1 by the following statement:

IF $(\bar{u} \in U_{dk})$ THEN |execute k-th one of inference expressions (4)| whereon the fuzzy inference is performed on the distorted flow distribution pattern. At this juncture, $U_{dk}$ represents the k-th measured flow velocity range to which the mean flow rate u in one of the measured flow velocity ranges $U_{d1}$ to $U_{dk}$ resulting from the division by K belongs, as described previously. Accordingly, in the subsequent execution of the inference, there will be selected only the distorted flow model membership function table T2k and the mean flow rate calculating expression table T3k. However, since $\zeta_{kl}=1$ (when $k=l$) and $\zeta_{kl}=0$ (when $k \neq l$), the steps F3 and F10 shown in FIG. 11 are rendered unnecessary with the result that $u_{0k}$ determined in the step F9 represents $u_0$.

According to the method described above, inference can be executed at an increased speed because it is sufficient to execute only one of the fuzzy inferences for K flow velocity levels, although stability or consistency of the inferred values for the flow velocity levels may be degraded more or less.

With the second embodiment of the invention described above, speeding-up of the inference is intended by using the tables T1 to T3 and the inference expressions of the first embodiment as they are. It will be however be appreciated that the tables and the inference expressions stored in the memory 12 may initially be so arranged as to speed up the inference execution, as described below in conjunction with a third embodiment of the invention.

Figure 13:
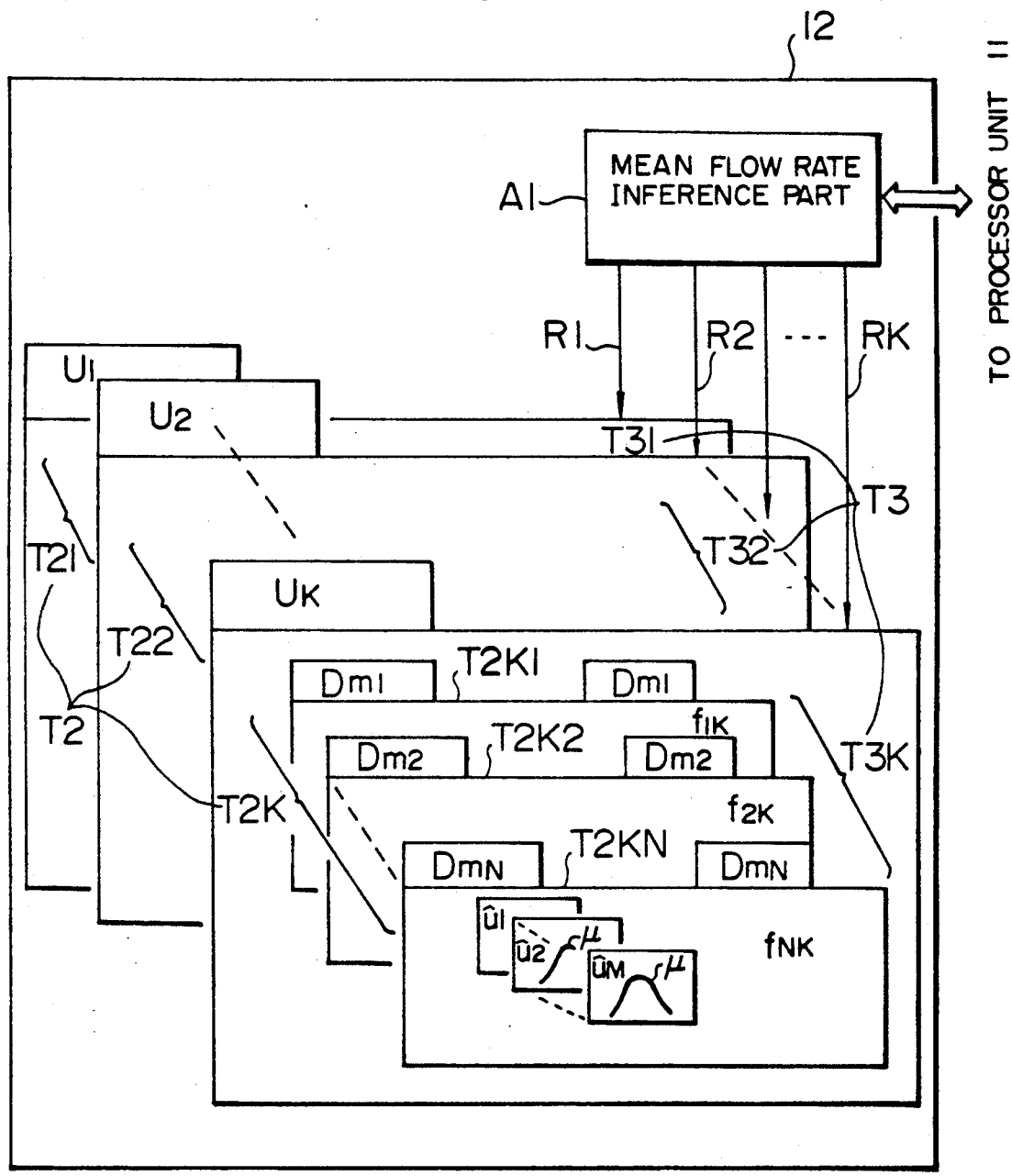
FIG. 13 is a view showing a structure of the memory employed in the flow rate measuring system according to a third embodiment of the invention.
Figure 14:
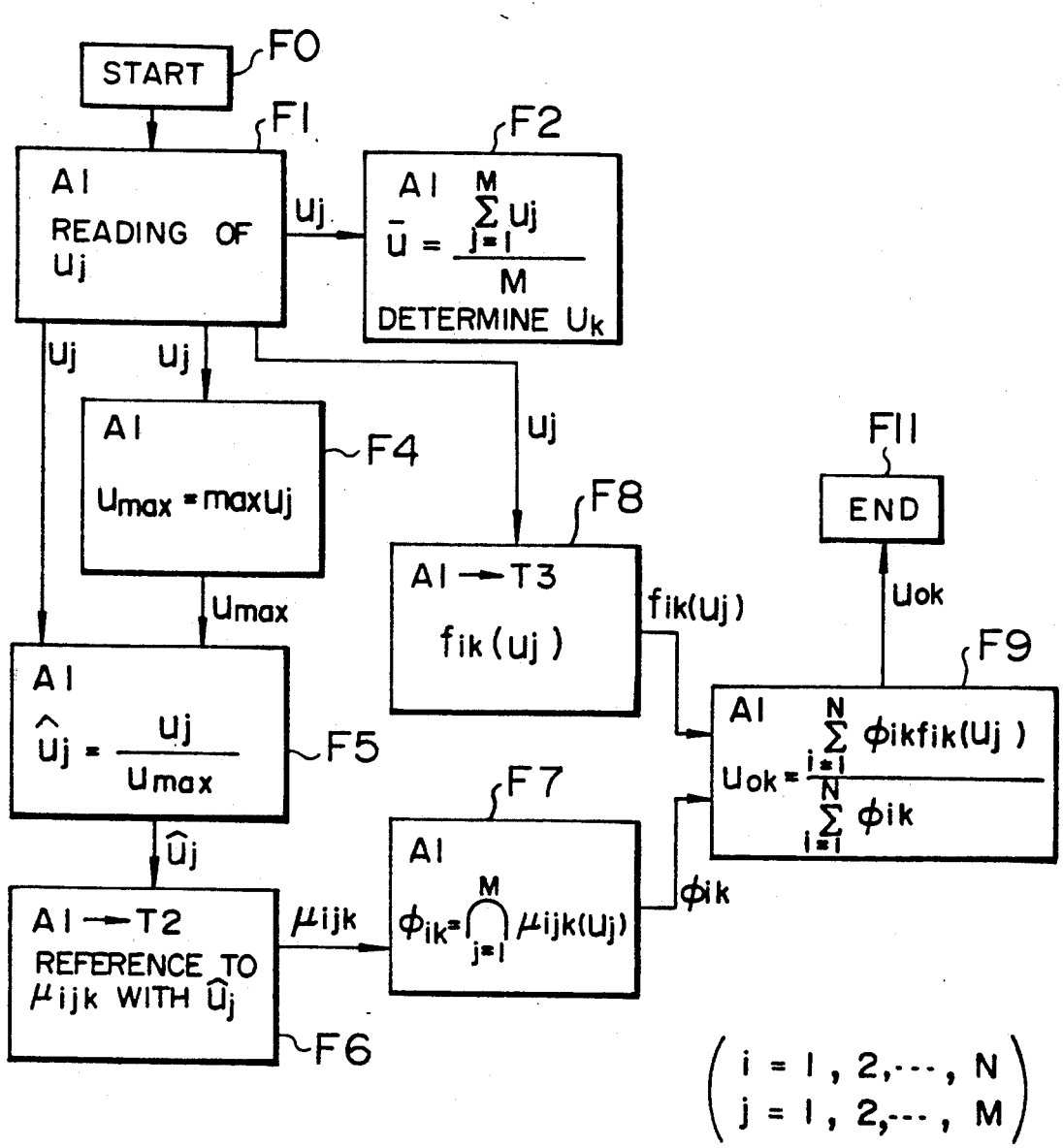
FIG. 14 is a flow chart for illustrating the inference procedure executed by a mean flow rate fuzzy inference part of the system according to the second embodiment of the invention.

FIG. 13 is a view showing a structure of the memory 12 implemented to speed up the inference in accordance with a third embodiment of the invention, wherein contents of the tables T1, T2 and T3 are same as those shown in FIG. 4. Further, FIG. 14 is a flow chart for illustrating the inference procedure according to the third embodiment. Referring to the figure, the inference part A1 calculates a mean value $\bar{u}$ of the flow velocity measurement values $u_1, u_2, \ldots, u_M$ to thereby determine the measured flow velocity range $U_{dk}$ to which the mean flow velocity value $\bar{u}$ belongs, as described hereinbefore in conjunction with the second embodiment (step F2). Subsequently, by referring to only the tables T2k and T3k specified by the flow velocity range $U_{dk}$ as determined, the steps F4 to F9 are executed. The value $u_{0k}$ determined at the step F9 is outputted as the mean or average value $u_0$.

As will now be understood from the foregoing, the inference methods according to the embodiments of the invention do not reside in determining merely a simple mean value of the individual sensor outputs but takes into account the characteristics of the distorted flow pattern prevailing at the sensor locations upon determining the mean value of the sensor outputs. By virtue of this feature, a plurality of the sensors need not necessarily be located on a same plane transversal to the axis of the pipe or within a predetermined range in the direction axially or diameterwise of the pipe. In other words, the individual sensors 51, 52, ..., 5M may be disposed at different positions along the flow of a fluid within the pipe with heights h which differ from one to another sensor, as is illustrated in FIG. 15. Thus, there can be increased the degree of freedom of selecting the positions internally of the pipe where the sensors are to be installed. With the disposition shown in FIG. 15, the individual sensors are disposed at different positions along the fluid flowing direction, whereby a temporal mean value of the flow rate can be determined.

Figure 16:
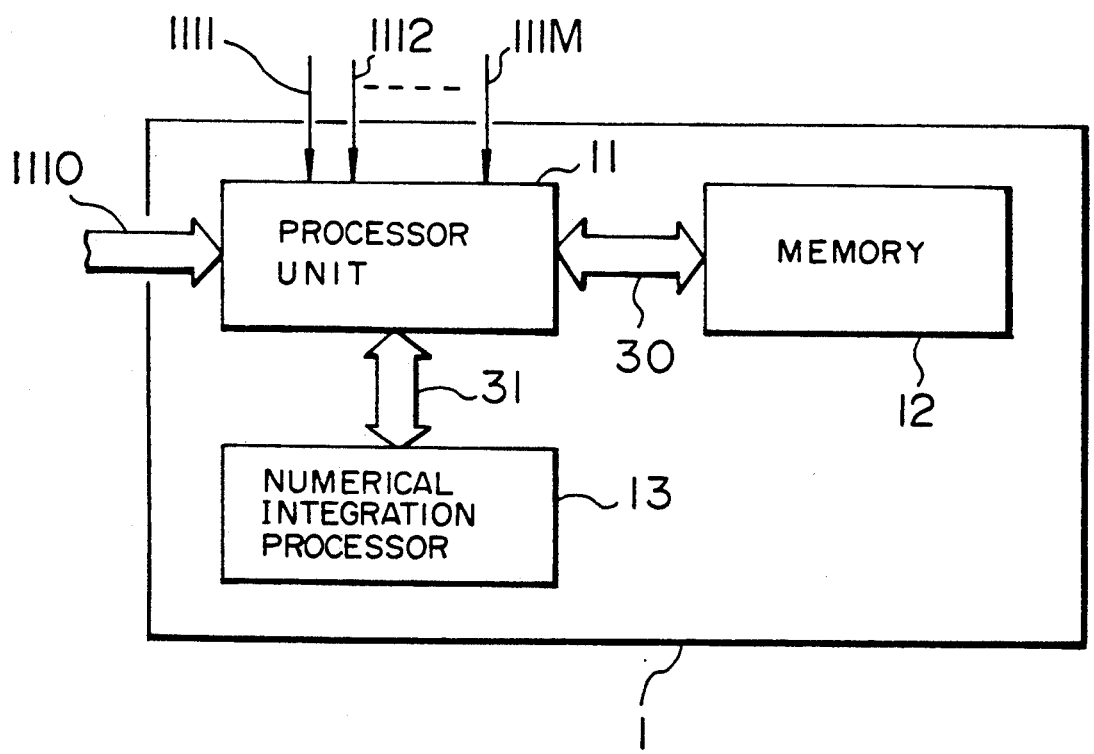
FIG. 16 is a view showing a structure of a fuzzy arithmetic unit according to a fourth embodiment of the invention.

In order to speed up the fuzzy inference, it is effective to execute the weighted mean determining arithmetic operation (fuzzy integration) at the steps F2, F9 and F10 in the inference procedure shown in FIG. 11. FIG. 16 shows a fourth embodiment of the invention implemented to this end. Referring to the figure, a numerical integration processor 13 incorporated in the fuzzy arithmetic unit 1 for performing a numerical integration is provided and connected to the processor unit 11 via the data bus 31.

Figure 17:
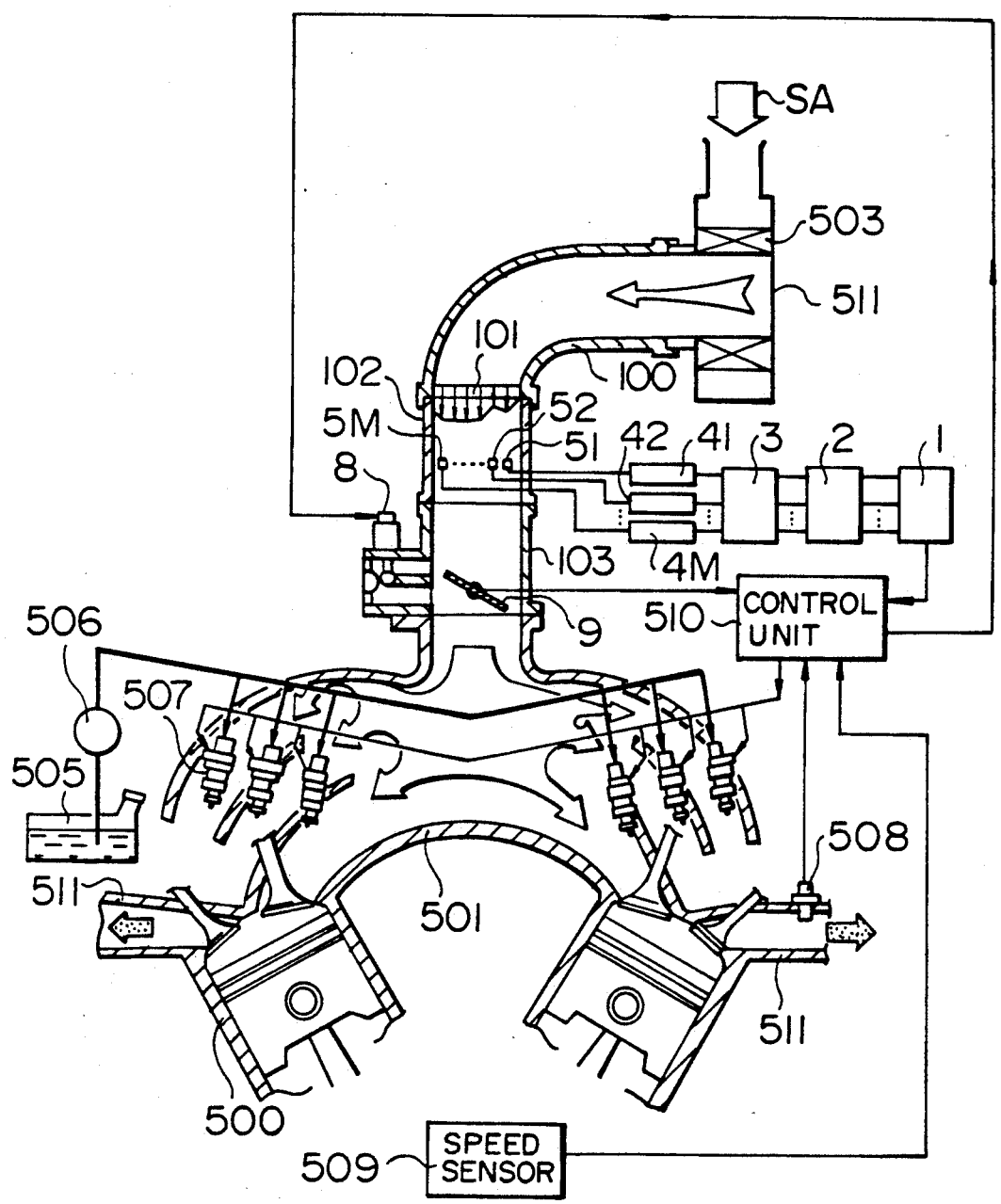
FIG. 17 is a view showing a general arrangement of an air suction system in an internal combustion engine to which an embodiment of the flow rate measuring system according to the invention is applied.

FIG. 17 is a view showing an air suction control system of an internal combustion engine to which an embodiment of the flow rate measuring system according to the invention is applied. Referring to the figure, a suction air flow denoted by a reference symbol SA is forced to flow through an air filter 503 contained in an air cleaner 511, a suction pipe 100, an air flow meter 102, a throttle valve 103 and an intake manifold 501 to be charged into a combustion chamber or chambers of the internal combustion engine.

Disposed in a main flow path of the air flow meter 102 are flow velocity sensors 51, 52, ..., 5M which are connected to detection circuits 41, 42, ..., 4M, respectively, whose outputs are in turn connected through a noise eliminating filter 3 and an analogue-to-digital (A/D) converter 2 to a fuzzy arithmetic unit 1 which is implemented in accordance with one of the first to third embodiments of the invention described above and by which the mean flow rate of air flowing through the suction pipe 100 is calculated by taking into account the distorted flow components generally denoted by 102. The throttle valve 9 disposed at a position downstream of the air flow meter 102 is interlocked to an accelerator pedal (not shown) for controlling the suction or intake air flow. Mounted on the throttle body 103 is an idle speed control valve 8 which serves for controlling the air flow at the time when the throttle valve 9 is fully closed. In FIG. 17, thick solid arrows indicate directions of fuel flows. The fuel pumped up from a fuel tank 505 by a fuel injection pump 506 is injected into within the manifold 501 through fuel injectors 507 to be mixed with the air flow having passed through the air flow meter 103, the resulting air-fuel mixture being charged into the engine 500.

A control unit 510 serves for arithmetically determining the amount of fuel injected through the injector and the opening degree of the idle speed control valve 8 on the basis of the output of the fuzzy arithmetic unit 1, an angular signal representing rotation of the throttle valve 9, an output signal of an oxygen concentration sensor 508 disposed within an exhaust manifold 511 and an output signal of an engine rotation speed sensor 509. In accordance with the results of the fuzzy arithmetic operation, the injectors 507 and the idle speed control valve 8 are correspondingly controlled.

The air suction pipe system of the internal combustion engine is often of a much intricate structure because of little space available for installation of the piping in the engine room, which makes it difficult to provide an auxiliary air flow path. Consequently, the air flow within the suction pipe contains significant disturbances or turbulence, fluidal noise and distorted flow components. By incorporating the flow measurement apparatus according to the invention in this kind of suction piping, the mean flow rate can be measured consistently with significantly improved accuracy regardless of the presence of distorted flows and noise, whereby high-precision air-fuel ratio control can be realized.

As will be apparent from the foregoing, the present invention provides advantageous effects mentioned below.

(1) Because of use of fuzzy integration for calculation of the intra-pipe mean flow rate, the flow rate value as determined is not affected by the output of any particular sensor, whereby the mean flow rate value can be obtained with high consistency and reliability, being protected against influence of local flow disturbances.

(2) Since the membership grade or fitness grade of a distorted flow pattern is determined for each of plural classified distorted flow model patterns and since extents of contribution of the distorted flow model patterns to the determination of the mean flow rate by using the membership grades (fitness grades) as the weights, it is possible to calculate appropriately the mean flow rate even for those distorted flow distributions which are intermediate the distorted flow model patterns.

(3) The membership functions for the distorted flow model patterns can be changed or modified by exchanging software. As a result, the flow rate measurement can flexibly be performed for a variety of distorted flows which differ from one another in respect to the distribution and the position where the disturbance takes place with the sensors being fixed in respect to the shape, location of installation, characteristics and other hardware aspects.

(4) The flow rate measuring system according to the invention can profitably be employed in internal combustion engines of motor vehicles. In that case, since the air flow rate can be measured with a high accuracy even in an air piping suction system of an intricate structure, the fuel injection amount can be regulated finely in dependence on the measured air flow rate. Thus, an air-fuel ratio control assuring a very high accuracy can be realized. In general, the geometrical factors such as shape of the pipe in the air suction system vary in dependence on the types of the motor vehicles. In this conjunction, the flow rate measuring system according to the invention can be applied to any types of the vehicles without need for any modifications including that of data contained in the memory.

The teachings of the invention can be applied to flow rate measurement of a variety of fluids regardless of whether it is liquid or gas.

I claim:

1. A flow rate measuring method, in control apparatus for controlling an internal combustion engine, of determining an intake flow rate of a fluid flowing through a suction pipe of said internal combustion engine by using a fuzzy inference system which is implemented on the basis of fuzzy knowledge including fuzzy rules each described in the form of an IF part and a THEN part, and membership functions defining meanings of statements described in said IF and THEN parts, said control apparatus including speed detecting means for detecting rotational speed of said internal combustion engine, fuel injection means for injecting a fuel into the intake air flow within said suction pipe and control means for regulating said fuel injection amount of said fuel injection means on the basis of weighted flow rate means value of said fluid and output signal of said speed detecting means for thereby controlling the rotational speed of said internal combustion engine said method comprising steps of:

measuring flow velocities of said fluid at a plurality of locations within said suction pipe;
   preparing a table of membership functions indicating grades of fitness of said flow velocities to a distorted flow model distribution;
   preparing a mean flow rate calculating expression giving a flow rate corresponding to said distorted flow model distribution;
   determining a membership grade of the measured flow velocities to said distorted flow model distribution by referring to said membership function table through the medium of said measured flow velocities; and
   calculating said weighted flow rate mean value given by said mean flow rate calculating expression by using as a weight said membership grade to said distorted flow model distribution.

2. A flow rate measuring method, in control apparatus for controlling an internal combustion engine, of determining an intake flow rate of a fluid flowing through a suction pipe of said internal combustion engine by using a fuzzy inference system which is implemented on the basis of fuzzy knowledge including fuzzy rules each described in the form of an IF part and a THEN part, and membership functions defining meanings of statements described in said IF and THEN parts, said control apparatus including, speed detecting means for detecting rotational speed of said internal combustion engine, fuel injection means for injecting a fuel into the intake air flow within said suction pipe, and control means for regulating said fuel injection amount of said fuel injection means on the basis of a weighted means of flow rates of said fluid and an outut signal of said speed detecting means for thereby controlling the rotational speed of said internal combustion engine, said method comprising steps of:

measuring flow velocities of said fluid at a plurality of locations within said pipe;
   preparing a membership function table containing membership functions indicating grades of fitness of said flow velocities to each of plural distorted flow model distributions;
   preparing mean flow rate calculating expressions giving flow rates corresponding to said distorted flow model distributions, respectively;
   determining membership grades of the measured flow velocities to each of said distorted flow model distributions by referring to said membership function table through the medium of said measured flow velocities; and
   calculating said weighted mean of said flow rates given by said mean flow rate calculating expressions by using as weights said membership grades to said distorted flow model distributions.

3. A flow rate measuring method, in control apparatus for controlling an internal combustion engine, of determining an intake flow rate of a fluid flowing through a suction pipe of said internal combustion engine by using a fuzzy inference system which is implemented on the basis of fuzzy knowledge including fuzzy rules each described in the form of an IF part and a THEN part, and membership functions defining meanings of statements described in said IF and THEN parts, said control apparatus including speed detecting means for detecting rotational speed of said internal combustion engine, fuel injection means for injecting a fuel into the intake air flow within said suction pipe, and control means for regulating said fuel injection amount of said fuel injection means on the basis of weighted mean of flow rates of said fluid and output signal of said speed detecting means for thereby controlling the rotational speed of said internal combustion engine, said method comprising steps of:

measuring flow velocities of said fluid at a plurality of locations within said pipe;
   preparing a first membership function table indicating grades of fitness of a mean value of said flow velocities within said pipe to each of plural flow velocity levels;
   preparing second membership function tables giving grades of fitness of said flow velocities to a distorted flow model distribution at each of said flow velocity levels;
   preparing mean flow rate calculating expressions giving flow rates corresponding to said distorted flow model distribution at said flow velocity levels, respectively;
   determining a mean value of the flow velocities measured at said plurality of locations within said pipe to thereby determine on the basis of said mean value first membership grades of said mean value to said flow levels, respectively, by reference to said first membership function table through the medium of said mean value;
   determining a second membership grade of said flow velocity values to said distorted flow model distribution at each of said flow velocity levels by reference to said second membership function tables through the medium of said measured flow velocity values; and
   calculating said weighted mean of said flow rates given by said mean flow rate calculating expressions for said flow velocity levels by using as weights said first and second membership grades.

4. A flow rate measuring method, in control apparatus for controlling an internal combustion engine, of determining an intake flow rate of a fluid flowing through a suction pipe of said internal combustion by using a fuzzy inference system which is implemented on the basis of fuzzy knowledge including fuzzy rules each described in the form of an IF part and a THEN part, and membership functions defining meanings of statements described in said IF and THEN parts, said control apparatus including speed detecting means for detecting rotational speed of said internal combustion engine, fuel injection means for injecting a fuel into the intake air flow within said suction pipe, and control means for regulating said fuel injection amount of said fuel injection means on the basis of a weighted mean of flow rates of said fluid and an output signal of said speed detecting means for thereby controlling the rotational speed of said internal combustion engine, said method comprising steps of:

measuring flow velocities of said fluid at a plurality of locations within said suction pipe;

preparing a first membership function table containing membership functions indicating grades of fitness of a mean value of said flow velocities within said suction pipe to plural flow velocity levels, respectively;

preparing second membership function tables containing membership functions indicating grades of fitness of said flow velocities to a plurality of distorted flow model distributions at said flow velocity level, respectively;

preparing mean flow rate calculating expressions giving flow rates corresponding to said distorted flow model distributions at said flow velocity levels, respectively;

determining a mean value of the flow velocities measured at said plurality of locations within said suction pipe to thereby determine on the basis of said mean value first membership grades of said mean value to said flow levels, respectively, by reference to said first membership function table through the medium of said mean value;

determining second membership grades or said flow velocity values to said distorted flow model distributions at said flow velocity levels, respectively, by reference to said second membership function table through the medium of said measured flow velocity values; and calculating said weighted mean of said flow rates given by said mean flow rate calculating expressions for said flow velocity levels, respectively, by using as weights said first and second membership grades.

5. A flow rate measuring method according to claim 4, wherein the step of calculating the flow rate within said pipe includes:

a step of determining weighted flow rate mean values in accordance with said mean flow rate calculating expression by using as weights said second membership grades as determined; and a step of deriving a weighted mean of said weighted flow rate mean values calculated in accordance with said mean flow rate calculating expression for said flow velocity levels by using as weights said first membership grades determined.

6. A flow rate measuring system, in control apparatus for controlling an internal combustion engine, for determining an intake flow rate of a fluid flowing through a suction pipe of said internal combustion engine by using a fuzzy inference system which is implemented on the basis of fuzzy knowledge including fuzzy rules each described in the form of an IF part and THEN part, and membership functions defining meanings of statements described in said IF and THEN parts, said control apparatus including speed detecting means for detecting rotational speed of said internal combustion engine, fuel injection means for injecting a fuel into the intake air flow within said suction pipe, and control means for regulating said fuel injection amount of said fuel injection means on the basis of an weighted mean of flow rates of said fluid and an output signal of said speed detecting means for thereby controlling the rotational speed of said internal combustion engine, said flow rate measuring system comprising:

a plurality of detecting means for measuring flow velocities of said fluid at a plurality of locations within said suction pipe;

storage means containing a table of membership functions giving grades of fitness of said flow velocities to a distorted flow model distribution;

storage means containing a mean flow rate calculating expression giving a flow rate corresponding to said distorted flow model distribution;

means for determining a membership grade of the measured flow velocities to said distorted flow model distribution by referring to said membership function table through the medium of said measured flow velocity; and means for determining a weighted mean value of said flow rates given by said mean flow rate calculating expression by suing as a weight said membership grade to said distorted flow model distribution.

7. A flow rate measuring system, in control apparatus for controlling an internal combustion engine, for determining an intake flow rate of a fluid flowing through a suction pipe of said internal combustion engine by using a fuzzy inference system which is implemented on the basis of fuzzy knowledge including fuzzy rules each described in the form of an IF part and a THEN part, and membership functions defining meanings of statements described in said IF and THEN parts, said control apparatus including speed detecting means for detecting rotational speed of said internal combustion engine, fuel injection means for injecting a fuel into the intake air flow within said suction pipe, and control means for regulating said fuel injection amount of said fuel injection means on the basis of an weighted mean of flow rates of said fluid and an output signal of said speed detecting means for thereby controlling the rotational speed of said internal combustion engine, said flow rate measuring system comprising:

a plurality of detecting means for measuring flow velocities of said fluid at a plurality of locations within said suction pipe;

storage means for storing a first membership function table containing membership functions indicating grades of fitness of a mean value of flow velocities within said suction pipe to a plurality of distorted flow velocity levels, respectively;

storage means for storing second membership function tables containing second membership functions indicating grades of fitness of said flow velocities to a plurality of distorted flow model distributions at said flow velocity levels, respectively;

means for determining membership grades of said flow velocity values to said distorted flow model distributions, respectively, by reference to said second membership function tables through the medium of said measured flow velocity values; and means for calculating a weighted mean of said flow rates given by said mean flow rate calculating expressions for said flow velocity levels, respectively, by using as weights said membership grades.

8. A flow rate measuring system, in control apparatus for controlling an internal combustion engine, for determining an intake flow rate of a fluid flowing through a suction pipe of said internal combustion engine by using a fuzzy inference system which is implemented on the basis of fuzzy knowledge including fuzzy rules each described in the form of an IF part and a THEN part, and membership functions defining meanings of statements described in said IF and THEN parts, said control apparatus including, speed detecting means for detecting rotational speed of said internal combustion engine, fuel injection means for injecting a fuel into the intake air flow within said suction pipe, and control means for regulating said fuel injection amount of said fuel injection means on the basis of a weighted mean of flow rates of said fluid and an output signal of said speed detecting means for thereby controlling the rotational speed of said internal combustion engine, said flow rate measuring system comprising:

a plurality of detecting means for mesuring flow velocities of said fluid at a plurality of locations within expression by using as weights said second membership grades said suction pipe;

storage means containing a first membership function table indicating grades of fitness of a mean value of said flow velocities within said pipe to a distorted flow velocity level;

storage means containing second membership function tables indicating grades of fitness of said flow velocities to distorted flow model distributions at said flow velocity levels, respectively;

storage means containing a mean flow rate calculating expressions giving a flow rate corresponding to said distorted flow model distribution at each of said flow velocity levels;

means for determining a mean value of the flow velocities measured at said plurality of locations within said suction pipe to thereby determine on the basis of said mean value a first membership grade of said mean value to said flow levels, respectively, by reference to said first membership function table through the medium of said mean value;

means for determining a second membership grade of said measured flow velocity values to said distorted flow model distributions for said flow velocity levels, respectively, by reference to said second membership function table through the medium of said measured flow velocity values; and means for calculating said weighted mean of said flow rates given by said mean flow rate calculating expressions for said flow velocity level, respectively, by using as weights said first and second membership grades, for thereby determining the flow rate of the fluid flowing within said pipe.

9. A flow rate measuring system, in control apparatus for controlling an internal combustion engine, for determining an intake flow rate of a fluid flowing through a suction pipe of said internal combustion engine by using a fuzzy inference system which is implemented on the basis of fuzzy knowledge including fuzzy rules each described in the form of an IF part and a THEN part, and membership functions defining meanings of statements described in said IF and THEN parts, said control apparatus including, speed detecting means for detecting rotational speed of said internal combustion engine, fuel injection means for injecting a fuel into the intake air flow within said suction pipe, and control means for regulating said fuel injection amount of said fuel injection means on the basis of a weighted mean of flow rates of said fluid and an output signal of said speed detecting means for thereby controlling the rotational speed of said internal combustion engine, said flow rate measuring system comprising:

a plurality of detecting means for measuring flow velocities of said fluid at a plurality of locations within said suction pipe;

storage means containing a first membership function table indicating grades of fitness of a mean value of said flow velocities within said suction pipe to a plurality of distorted flow velocity level, respectively;

storage means containing a second membership function table indicating grades of fitness of said flow velocities to a plurality of distorted flow model distributions for said flow velocity levels, respectively;

storage means continuing a mean flow rate calculating expressions for deriving flow rates corresponding to said distorted flow model distributions at said flow velocity levels, respectively;

means for determining a mean value of the flow velocities measured at said plurality of locations within said suction pipe to thereby determine on the basis of said mean value a first membership grades of said mean value to said flow levels, respectively, by reference to said first membership function table through the medium of said mean value;

means for determining a second membership grades of said flow velocity values to said distorted flow model distributions for said flow velocity levels, respectively, by reference to said second membership function table through the medium of said measured flow velocity values; and means for calculating said weighted mean of said flow rates given by said mean flow rate calculating expressions, respectively, by using as weights said first and second membership grades, for thereby determining the flow rate of the fluid within said suction pipe.

10. A flow rate measuring system according to claim 9, wherein said means for calculating the flow rate within said pipe includes:

means for determining weighted flow rate mean values in accordance with said mean flow rate calculating expression by using as weights said second membership grades as determined; and means for deriving a weighted mean of said weighted flow rate mean values calculated in accordance with said mean flow rate calculating expression for said flow velocity levels by using as a weight said first membership grade as determined.

11. A flow rate measuring system according to claim 9, wherein said plurality of detecting means are disposed in a same plane extending orthogonally to the longitudinal axis of said pipe.

12. A flow rate measuring system according to claim 9, wherein said plurality of detecting means are disposed along a direction in which said fluid flows within said pipe.

13. A flow rate measuring method of determining a flow rate of a fluid flowing through an intake pipe of an internal combustion engine of an internal combustion engine by using a flow rate measuring system including a fuzzy inference system which is implemented on the basis of fuzzy knowledge including fuzzy rules each described in the form of an IF part and a THEN part, and membership functions defining meanings of statements described in said IF and THEN parts, said method comprising steps, performed by said flow rate measuring system, of:
measuring flow velocities of said fluid at a plurality of locations within said pipe;
preparing a table of membership functions indicating grades of fitness of said flow velocities to a distorted flow model distribution;
preparing a mean flow rate calculating expression giving a flow rate corresponding to said distorted flow model distribution;
determining a membership grade of the measured flow velocities to said distorted flow model distribution by referring to said membership function table through the medium of said measured flow velocities;
calculating a weighted flow rate mean value given by said mean flow rate calculating expression by using as a weight said membership grade to said distorted flow model distribution; and
regulating fuel injection amount of fuel injection amount of fuel injection means of said internal combustion engine on the basis of said weighted flow rate mean value and a signal indicative of rotational speed of said internal combustion engine, thereby controlling the rotational speed of said internal combustion engine.

14. A flow rate measuring method of determining a flow rate of a fluid flowing through an intake pipe of an internal combustion engine of an internal combustion engine by using a flow rate measuring system including a fuzzy inference system which is implemented on the basis of fuzzy knowledge including fuzzy rules each described in the form of an IF part and a THEN part, and membership functions defining meanings of statements described in said IF and THEN parts, said method comprising steps, performed by said flow rate measuring system, of:
measuring flow velocities of said fluid at a plurality of locations within said pipe;
preparing a membership function table containing membership functions indicating grades of fitness of said flow velocities to each of plural distorted flow model distributions;
preparing mean flow rate calculating expressions giving flow rates corresponding to said distorted flow model distributions, respectively;
determining membership grades of the measured flow velocities to each of said distorted flow model distributions by referring to said membership function table through the medium of said measured flow velocities; and calculating a weighted mean of said flow rates given by said mean flow rate calculating expressions by using as weights said membership grades to said distorted flow model distributions; and
regulating fuel injection amount of fuel injection amount of fuel injection means of said internal combustion engine on the basis of said weighted mean of said flow rates and a signal indicative of rotational speed of said internal combustion engine, thereby controlling the rotational speed of said internal combustion engine.

15. A flow rate measuring method of determining a flow rate of a fluid flowing through an intake pipe of an internal combustion engine of an internal combustion engine by using a fuzzy inference system which is implemented on the basis of fuzzy knowledge including fuzzy rules each described in the form of an IF part and a THEN part, and membership functions defining meanings of statements described in said IF and THEN parts, said method comprising steps, performed by said flow rate measuring system, of:
measuring flow velocities of said fluid at a plurality of locations within said pipe;
preparing a first membership function table indicating grades of fitness of a mean value of said flow velocities within said pipe to each of plural flow velocity levels;
preparing second membership function tables giving grades of fitness of said flow velocities to a distorted flow model distribution at each of said flow velocity levels;
preparing mean flow rate calculating expressions giving flow rates corresponding to said distorted flow model distribution at said flow velocity levels, respectively;
determining a mean value of the flow velocities measured at said plurality of locations within said pipe to thereby determine on the basis of said mean value first membership grades of said mean value to said flow levels, respectively, by reference to said first membership function table through the medium of said mean value;
determining a second membership grade of said flow velocity values to said distorted flow model distribution at each of said flow velocity levels by reference to said second membership function tables through the medium of said measured flow velocity values;
calculating a weighted mean of said flow rates given by said mean flow rate calculating expressions for said flow velocity levels by using as weights said first and second membership grades; and
regulating fuel injection amount of fuel injection amount of fuel injection means of said internal combustion engine on the basis of said weighted mean of said flow rates and a signal indicative of rotational speed of said internal combustion engine, thereby controlling the rotational speed of said internal combustion engine.

16. A flow rate measuring method of determining a flow rate of a fluid flowing through an intake pipe of an internal combustion engine by using a flow rate measuring system including fuzzy inference system which is implemented on the basis of fuzzy knowledge including fuzzy rules each described in the form of an IF part and a THEN part, and membership functions defining meanings of statements described in said IF and THEN parts, said method comprising steps, performed by said flow rate measuring system, of:

measuring flow velocities of said fluid at a plurality of locations within said pipe;

preparing a first membership function table containing membership functions indicating grades of fitness of a mean value of said flow velocities within said pipe to plural flow velocity levels, respectively;

preparing second membership function tables containing membership functions indicating grades of fitness of said flow velocities to a plurality of distorted flow model distributions at said flow velocity level, respectively;

preparing mean flow rate calculating expressions giving flow rates corresponding to said distorted flow model distributions at said flow velocity levels, respectively;

determining a mean value of the flow velocities measured at said plurality of locations within said pipe to thereby determine on the basis of said mean value first membership grades of said mean value to said flow levels, respectively, by reference to said first membership function table through the medium of said mean value;

determining second membership grades or said flow velocity values to said distorted flow model distributions at said flow velocity levels, respectively, by reference to said second membership function table through the medium of said measured flow velocity values;

calculating a weighted mean of said flow rates given by said mean flow rate calculating expressions for said flow velocity levels, respectively, by using as weights said first and second membership grades; and regulating fuel injection amount of fuel injection amount of fuel injection means of said internal combustion engine on the basis of said weighted mean of said flow rates and a signal indicative of rotational speed of said internal combustion engine, thereby controlling the rotational speed of said internal combustion engine.

17. A flow rate measuring method according to claim 16, wherein the step of calculating the flow rate within said pipe includes:

a step of determining weighted flow rate mean value in accordance with said mean flow rate calculating expression by using as weights said second membership grades as determined; and a step of deriving a weighted mean of said weighted flow rate mean values calculated in accordance with said mean flow rate calculating expression for said flow velocity levels by using as weights said first membership grades determined.

18. A flow rate measuring system for determining a flow rate of a fluid flowing through an intake pipe of an internal combustion engine by using a flow rate measuring system including fuzzy inference system which is implemented on the basis of fuzzy knowledge including fuzzy rules each described in the form of an IF part and a THEN part, and membership functions defining meanings of statements described in said IF and THEN parts, said flow rate measuring system comprising:

a plurality of detecting means for measuring flow velocities of said fluid at a plurality of locations within said pipe;

storage means containing a table of membership functions giving grades of fitness of said flow velocities to a distorted flow model distribution;

storage means containing a mean flow rate calculating expression giving a flow rate corresponding to said distorted flow model distribution;

means for determining a membership grade of the measured flow velocities to said distorted flow model distribution by referring to said membership function table through the medium of said measured flow velocity;

means for determining a weighted mean value of said flow rates given by said mean flow rate calculating expression by suing as a weight said membership grade to said distorted flow model distribution; and control means for regulating fuel injection amount of fuel injection means of said internal combustion engine on the basis of said weighted mean of said flow rates mean value and a signal indicative of rotational speed of said internal combustion engine, thereby controlling the rotational speed of said internal combustion engine.

19. A flow rate measuring system for determining a flow rate of a fluid flowing through an intake pipe of an internal combustion engine by using a flow rate measuring system including fuzzy inference system which is implemented on the basis of fuzzy knowledge including fuzzy rules each described in the form of an IF part and a THEN part, and membership functions defining meanings of statements described in said IF and THEN parts, said flow rate measuring system comprising:

a plurality of detecting means for measuring flow velocities of said fluid at a plurality of locations within said pipe;

storage means for storing a first membership function table containing membership function indicating grades of fitness of a mean value of said flow velocities within said pipe to a plurality of distorted flow velocity levels, respectively;

storage means for storing second membership function tables containing second membership functions indicating grades of fitness of said flow velocities to a plurality of distorted flow model distributions at said flow velocity levels, respectively;

means for determining membership grades of said flow velocity values to said distorted flow model distributions, respectively, by reference to said second membership function tables through the medium of said measured flow velocity values;

means for calculating a weighted mean of said flow rates given by said mean flow rate calculating expressions for said flow velocity levels, respectively, by using as weights said membership grades; and control means for regulating fuel injection amount of fuel injection means of said internal combustion engine on the basis of said weighted means of said flow rates mean value and a signal indicative of rotational speed of said internal combustion engine, thereby controlling the rotational speed of said internal combustion engine.

20. A flow rate measuring system for determining a flow rate of a fluid flowing through an intake pipe of an internal combustion engine by using a flow rate measuring system including fuzzy inference system which is implemented on the basis of fuzzy knowledge including fuzzy rules each described in the form of an IF part and a THEN part, and membership functions defining meanings of statements described in said IF and THEN parts, said flow rate measuring system comprising:

a plurality of detecting means for measuring flow velocities of said fluid at a plurality of locations within said pipe;

storage means containing a first membership function table indicating grades of fitness of a mean value of said flow velocities within said pipe to a distorted flow velocity level;

storage means containing second membership function tables indicating grades of fitness of said flow velocities to distorted flow model distributions at said flow velocity levels, respectively;

storage means containing a mean flow rate calculating expressions giving a flow rate corresponding to said distorted flow model distribution at each of said flow velocity levels;

means for determining a mean value of the flow velocities measured at said plurality of locations within said pipe to thereby determine on the basis of said mean value a first membership grade of said mean value to said flow levels, respectively, by reference to said first membership function table through the medium of said mean value;

means for determining a second membership grade of said measured flow velocity values to said distorted flow model distribution for said flow velocity levels, respectively, by reference to said second membership function table through the medium of said measured flow velocity values;

means for calculating a weighted mean of said flow rates given by said mean flow rate calculating expressions for said flow velocity level, respectively, by using as weights said first and second membership grades, for thereby determining the flow rate of the fluid flowing within said pipe; and control means for regulating fuel injection amount of fuel injection means of said internal combustion engine on the basis of said weighted mean of said flow rates mean value and a signal indicative of rotational speed of said internal combustion engine, thereby controlling the rotational speed of said internal combustion engine.

21. A flow rate measuring system for determining a flow rate of a fluid flowing through an intake pipe of an internal combustion engine by using a flow rate measuring system including fuzzy inference system which is implemented on the basis of fuzzy knowledge including fuzzy rules each described in the form of an IF part and a THEN part, and membership functions defining meanings of statements described in said IF and THEN parts, said flow rate measuring system comprising:

a plurality of detecting means for measuring flow velocities of said fluid at a plurality of locations within said pipe;

storage means containing a first membership function table indicating grades of fitness of mean value of said flow velocities within said pipe to a plurality of distorted flow velocity level, respectively;

storage means containing a second membership function table indicating grades of fitness of said flow velocities to a plurality of distorted flow model distributions for said flow velocity levels, respectively;

storage means continuing mean flow rate calculating expressions for deriving flow rates corresponding to said distorted flow model distributions at said flow velocity levels, respectively;

means for determining a mean value of the flow velocities measured at said plurality of locations within said pipe to thereby determine on the basis of said mean value a first membership grades of said mean value to said flow levels, respectively, by reference to said first membership function table through the medium of said mean value;

means for determining a second membership grades of said flow velocity values to said distorted flow model distributions for said flow velocity levels, respectively, by reference to said second membership function table through the medium of said measured flow velocity values;

means for calculating a weighted mean of said flow rates given by said mean flow rate calculating expressions, respectively, by using as weights said first and second membership grades, for thereby determining the flow rate of the fluid within said pipe; and control means for regulating fuel injection amount of fuel injection means of said internal combustion engine on the basis of said weighted mean of said flow rates mean value and a signal indicative of rotational speed of said internal combustion engine, thereby controlling the rotational speed of said internal combustion engine.

22. A flow rate measuring system according to claim 21, wherein said means for calculating the flow rate within said pipe includes:

means for determining weighted flow rate mean values in accordance with said mean flow rate calculating expression by using as weights said second membership grades as determined; and means for deriving a weighted mean of said weighted flow rate mean values calculated in accordance with said mean flow rate calculating expression for said flow velocity levels by using as a weighted said first membership grade as determined.

23. A flow rate measuring system according to claim 21, wherein said plurality of detecting means are disposed in a same plane extending orthogonally to the longitudinal axis of said pipe.

24. A flow rate measuring system according to claim 21, wherein said plurality of detecting means are disposed along a direction in which said fluid flows within said pipe.

* * * * *